United States Patent
Ellis-Monaghan et al.

(10) Patent No.: US 8,238,032 B2
(45) Date of Patent: Aug. 7, 2012

(54) VARIABLE FOCUS POINT LENS

(75) Inventors: John Joseph Ellis-Monaghan, Grand Isle, VT (US); Jeffrey Peter Gambino, Westford, VT (US); Kirk David Peterson, Jericho, VT (US); Jed Hickory Rankin, Richmond, VT (US)

(73) Assignee: International Business Machines Corporation, Armonk, NY (US)

( * ) Notice: Subject to any disclaimer, the term of this patent is extended or adjusted under 35 U.S.C. 154(b) by 231 days.

(21) Appl. No.: 12/708,561

(22) Filed: Feb. 19, 2010

(65) Prior Publication Data
US 2011/0208482 A1 Aug. 25, 2011

(51) Int. Cl.
*G02B 3/12* (2006.01)
(52) U.S. Cl. ........................... 359/665; 703/1
(58) Field of Classification Search .......... 359/665–667; 703/1
See application file for complete search history.

(56) References Cited

U.S. PATENT DOCUMENTS

| 2003/0169399 A1 | 9/2003 | Smith |
| 2007/0030573 A1* | 2/2007 | Batchko et al. ............... 359/665 |
| 2008/0252990 A1* | 10/2008 | Onuki et al. ................... 359/666 |
| 2011/0085131 A1* | 4/2011 | Gupta et al. ................... 351/176 |

* cited by examiner

*Primary Examiner* — Darryl J Collins
(74) *Attorney, Agent, or Firm* — Scully, Scott, Murphy & Presser, P.C.; Anthony J. Canale

(57) ABSTRACT

A variable focal point lens includes a transparent tank, which comprises a transparent enclosure containing a transparent flexible membrane separating the inner volume of the transparent tank into an upper tank portion and a lower tank portion. The upper tank portion and the lower tank portion contain liquids having different indices of refraction. The transparent flexible membrane is electrostatically displaced to change the thicknesses of the first tank portion and the second tank portion in the path of the light, thereby shifting the focal point of the lens axially and/or laterally. The electrostatic displacement of the membrane may be effected by a fixed charge in the membrane and an array of enclosure-side conductive structures on the transparent enclosure, or an array of membrane-side conductive structures on the transparent membrane and an array of enclosure-side conductive structures.

30 Claims, 12 Drawing Sheets

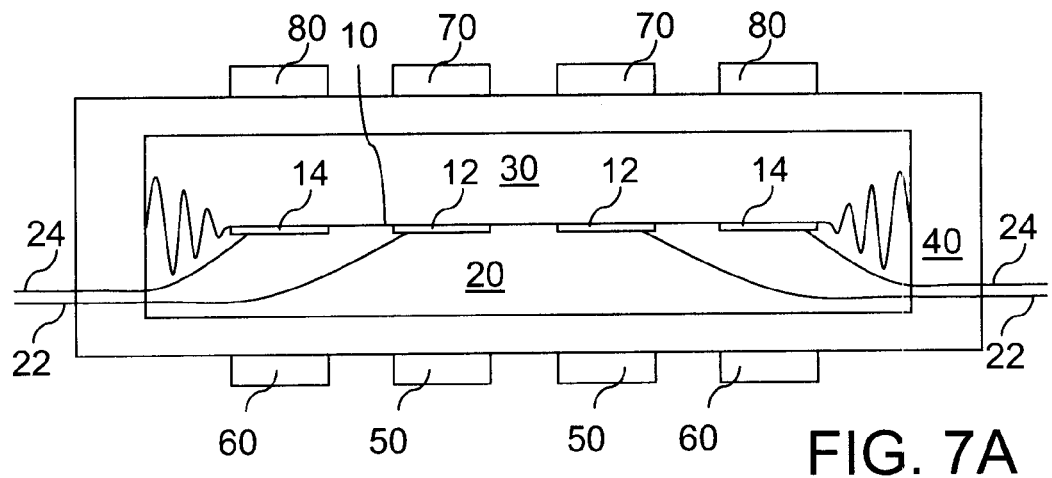
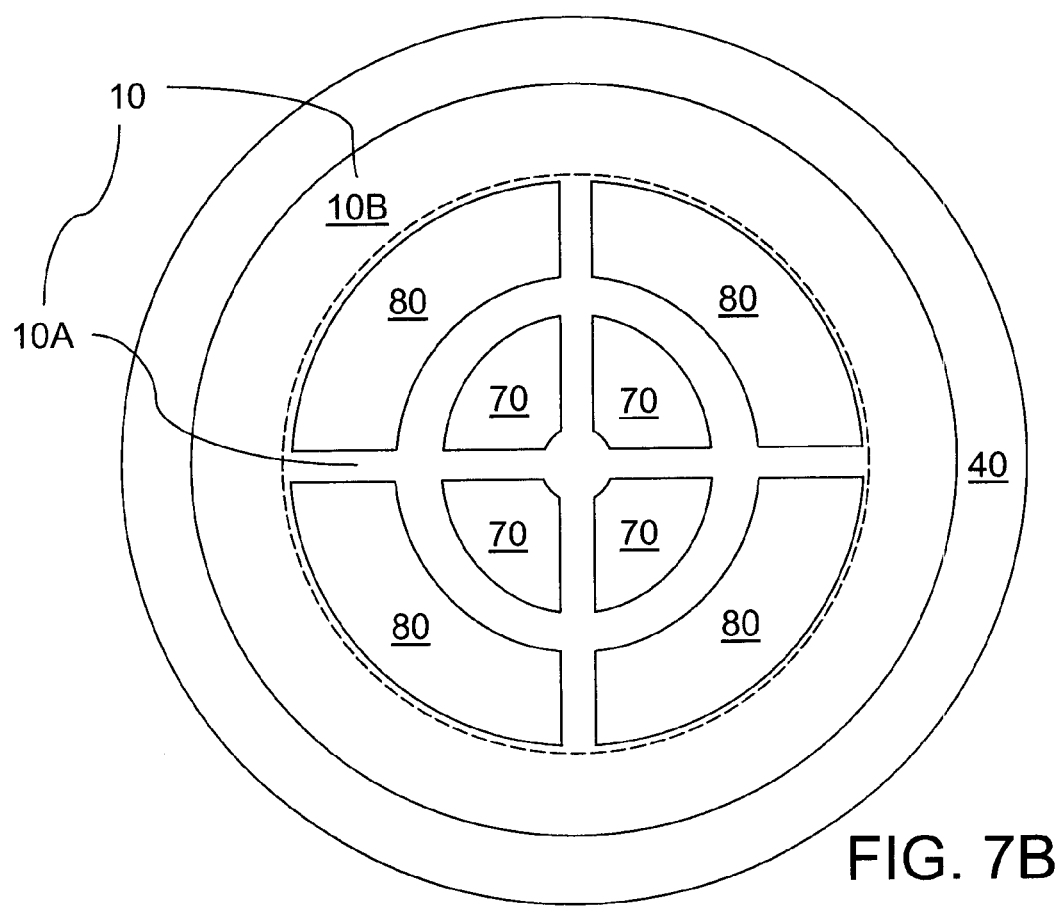

VARIABLE FOCUS POINT LENS

FIELD OF THE INVENTION

The present invention relates to a lens structure having an axially and laterally variable focal point, and a design structure and a method of operating for the same.

BACKGROUND

A lens is an optical structure that refracts light thereby concentrating or diverging the beam. A lens may be a simple lens consisting of a single contiguous structure or a compound lens comprising an array of disjoined simple lenses.

Lenses are used as contact lenses and eyeglasses to improve personal vision. Lenses are also employed in a variety of optical devices including microscopes, telescopes, binoculars, projectors, cameras, etc. Lenses may also be used in Micro-Electro-Mechanical Systems (MEMS), which employ microscopic structures having dimensions ranging from atomic dimensions, i.e., nanoscale, to a few millimeters to provide modification of a path of a beam.

Operation of a lens is best understood with the focal point of the lens. The dimension between the lens and the focal point is the focal length. The focal point may be located on the side of the lens from which the light emerges, in which case the lens converges the beam, or may be located on the side of the lens on which the incident light impinges, in which case the lens diverges the beam.

Operation of a lens often requires adjustment of the distance between the lens and an imaging system, which may be a photographic film, retina of an eye, or a light conversion device such as a photosensitive diode, to provide an image without loss of image resolution. Such a requirement may arise from changes in the distance between an object and the lens, or may arise from changes in the ambient that affect the refractive index of components of a lens system, e.g., ambient temperature changes in a lens system of a large telescope in an observatory.

FIG. 1 shows an exemplary prior art lens system, in which an image sensor 110 is located in the light path behind a prior art lens 120. The distance d between the image sensor 110 and the prior art lens 120 is greater than the focal length f of the prior art lens 120. Should the need arise to alter the distance d between the prior art lens 120 and the image sensor, the relative position between the prior art lens 120 and the image sensor 110 is changed. Such a change may be effected by moving the prior art lens 120 alone, by moving the image sensor 110 alone, or by moving both the prior art lens 120 and the image sensor 110.

While such physical movements are feasible in some circumstances, requirement to incorporate a movable part into a structure typically poses a heavy burden on engineering. To enable physical movement, a motorized driver, a power supply system, and a guide system are typically needed, thereby complicating the design of a lens system. Such a requirement poses an especially serious engineering challenge in Micro-Electro-Mechanical Systems. Further, in many applications, a more compact lens design that does not employ a driving system for physical movement is preferred compared to a bulky lens system.

In view of the above, there exists a need for a lens that enables formation of a high resolution image in an optically sensitive element of an optical system over a range of distances between the lens and the object of the image, and a design structure embodied in a machine readable medium for designing, manufacturing, or testing a design for the same.

Particularly, there exists a need for a lens that may alter of optical paths to accommodate the changes in the distance between the object and the lens without changing the physical distance between the lens and the optically sensitive element, and a design structure embodied in a machine readable medium for designing, manufacturing, or testing a design for the same.

BRIEF SUMMARY

To address the needs described above, the present invention provides a design structure for a lens having an axially and laterally variable focal point to adjust optical paths between the lens and an optically sensitive element without a physical movement of the lens relative to the optically sensitive element.

In the present invention, a variable focal point lens comprising a transparent tank is provided. The transparent tank comprises a transparent enclosure containing a transparent flexible membrane separating an inner volume of the transparent tank into an upper tank portion and a lower tank portion. The upper tank portion and the lower tank portion contain liquids having different indices of refraction. The transparent flexible membrane is electrostatically displaced to change the thicknesses of the upper tank portion and the lower tank portion in the path of the light, thereby shifting the focal point of the lens axially and/or laterally. The electrostatic displacement of the membrane may be effected by a fixed charge in the membrane and an array of enclosure-side conductive structures on the transparent enclosure, or an array of membrane-side conductive structures on the transparent membrane and an array of enclosure-side conductive structures.

Further, a design structure for a lens comprising a transparent tank is provided. The design structure comprises a first data representing the transparent tank, a second data representing a second data representing a transparent membrane, and a third data representing a means for inducing a non-planar inflection in the transparent membrane. The upper tank portion and the lower tank portion contain liquids having different indices of refraction. The transparent flexible membrane is electrostatically displaced to change the thicknesses of the first tank portion and the second tank portion in the path of the light, thereby shifting the focal point of the lens axially and/or laterally. The electrostatic displacement of the membrane may be effected by a fixed charge in the membrane and an array of enclosure-side conductive structures on the transparent enclosure, or an array of membrane-side conductive structures on the transparent membrane and an array of enclosure-side conductive structures.

According to an aspect of the present invention, an optical structure is provided, which comprises:
a enclosure comprising a transparent upper surface and a transparent lower surface;
a transparent membrane located within the enclosure and dividing a volume within the enclosure into an upper tank portion and a lower tank portion;
a first fluid having a first refractive index and filling the upper tank portion;
a second fluid having a second refractive index and filling the lower tank portion, wherein the second refractive index is different from the first refractive index; and
at least one enclosure-side conductive structure which abuts the enclosure and is substantially transparent.

In one embodiment, the first fluid and the second fluid are non-conductive.

In another embodiment, the at least one enclosure-side conductive structure comprises a mesh of conductive wires.

In even another embodiment, the at least one enclosure-side conductive structure comprises a transparent conductive plate.

In yet another embodiment, the at least one enclosure-side conductive structure comprises an array of enclosure-side conductive structures. The array of enclosure-side conductive structures may comprise at least two groups of enclosure-side conductive structures having different radial distance from a center of the transparent upper surface or a center of the transparent lower surface. The array of enclosure-side conductive structures may comprise at least two groups of enclosure-side conductive structures having different azimuthal angles around a center of the transparent upper surface or a center of the transparent lower surface.

In still another embodiment, the at least one enclosure-side conductive structure comprises at least one upper enclosure-side conductive structure abutting the upper enclosure and at least one lower enclosure-side conductive structure abutting the lower enclosure.

In still yet another embodiment, the transparent membrane is electrically charged and electrically isolated from the enclosure.

In a further embodiment, the optical structure further comprises:
at least one membrane-side conductive structure which abuts the transparent membrane and is substantially transparent; and
at least one conductive strip, wherein one end of each of the at least one conductive strip is attached to one of the at least one membrane side conductive structure and another end of each of the at least one conductive strip extends outside the enclosure for electrical connection.

In an even further embodiment, the at least one membrane-side conductive structure comprises a mesh of conductive wires.

In a yet further embodiment, the at least one membrane-side conductive structure comprises a transparent conductive plate.

In a still further embodiment, the at least one membrane-side conductive structure comprises an array of enclosure-side conductive structures. The array of membrane-side conductive structures may comprise at least two groups of membrane-side conductive structures having different radial distance from a center of the transparent upper surface or a center of the transparent lower surface. The array of membrane-side conductive structures may comprise at least two groups of membrane-side conductive structures having different azimuthal angles around a center of the transparent upper surface or a center of the transparent lower surface.

According to another aspect of the present invention, a design structure embodied in a machine readable medium for designing, manufacturing, or testing a design for an optical structure is provided. The design structure comprises:
a first data representing an enclosure comprising a transparent upper surface and a transparent lower surface;
a second data representing a transparent membrane located within the enclosure and dividing a volume within the enclosure into an upper tank portion and a lower tank portion; and
a third data representing a means for inducing a non-planar inflection in the transparent membrane.

In one embodiment, the means for inducing a non-planar inflection is at least one enclosure-side conductive structure which abuts the enclosure and is substantially transparent.

In another embodiment, the design structure further comprises:
a fourth data representing a first fluid having a first refractive index and filling the upper tank portion; and
a fifth data representing a second fluid having a second refractive index and filling the lower tank portion, wherein the second refractive index is different from the first refractive index.

In one case, each of the at least one enclosure-side conductive structure may comprise a mesh of conductive wires. In another case, each of the at least one enclosure-side conductive structure may comprise a transparent conductive plate.

In even another embodiment, the at least one enclosure-side conductive structure comprises an array of enclosure-side conductive structures.

In one case, the array of enclosure-side conductive structures may comprise at least two groups of enclosure-side conductive structures having different radial distance from a center of the transparent upper surface or a center of the transparent lower surface. In another case, the array of enclosure-side conductive structures may comprise at least two groups of enclosure-side conductive structures having different azimuthal angles around a center of the transparent upper surface or a center of the transparent lower surface.

In yet another embodiment, the at least one enclosure-side conductive structure comprises at lest one upper enclosure-side conductive structure abutting the upper enclosure and at least one lower enclosure-side conductive structure abutting the lower enclosure.

In still yet another embodiment, the transparent membrane is electrically charged and electrically isolated from the enclosure.

In a further embodiment, the design structure further comprises:
a sixth data representing at least one membrane-side conductive structure which abuts the transparent membrane and is substantially transparent; and
a seventh data representing at least one conductive strip, wherein one end of each of the at least one conductive strip is attached to one of the at least one membrane side conductive structure and another end of each of the at least one conductive strip extends outside the enclosure for electrical connection.

In an even further embodiment, each of the at least one membrane-side conductive structure comprises a mesh of conductive wires.

In a yet further embodiment, each of the at least one membrane-side conductive structure comprises a transparent conductive plate.

In a still further embodiment, the at least one membrane-side conductive structure comprises an array of enclosure-side conductive structures.

In a still yet further embodiment, the array of membrane-side conductive structures comprises at least two groups of membrane-side conductive structures having different radial distance from a center of the transparent upper surface or a center of the transparent lower surface.

In further another embodiment, the array of membrane-side conductive structures comprises at least two groups of membrane-side conductive structures having different azimuthal angles around a center of the transparent upper surface or a center of the transparent lower surface.

In even further another embodiment, the design structure comprises a netlist.

In still further another embodiment, the design structure resides on storage medium as a data format used for exchange of layout data of integrated circuits.

The design structure may further comprise a data representing an optically sensitive element separated from the enclosure.

The optically sensitive element may be a light conversion device.

According to yet another aspect of the present invention, a method of operating an optical structure is provided, which comprises:

placing an optical structure in an optical path between an object and an optically sensitive element, wherein the optical structure comprises:

an enclosure comprising a transparent upper surface and a transparent lower surface;

a transparent membrane located within the enclosure and dividing a volume within the enclosure into an upper tank portion and a lower tank portion;

a first fluid having a first refractive index and filling the upper tank portion; and a second fluid having a second refractive index and filling the lower tank portion, wherein the second refractive index is different from the first refractive index; and inducing a non-planar inflection of the transparent membrane, wherein the optical path is altered by the non-planar inflection.

In one embodiment, the non-planar inflection is induced by electrostatic means.

In another embodiment, a focal length of the optical structure is altered by the non-planar inflection.

In yet another embodiment, a focal point of the optical structure is laterally shifted by the non-planar inflection.

In still another embodiment, the physical location of the enclosure of the optical structure is held constant relative to the optically sensitive element while the non-planar inflection is induced.

BRIEF DESCRIPTION OF THE SEVERAL VIEWS OF THE DRAWINGS

FIG. 7A is a vertical cross-sectional view of a fifth exemplary optical structure according to a fifth embodiment of the present invention.

FIG. 7B is a top-down view of the fifth exemplary optical structure according to the fifth embodiment of the present invention.

DETAILED DESCRIPTION

Figure 1:
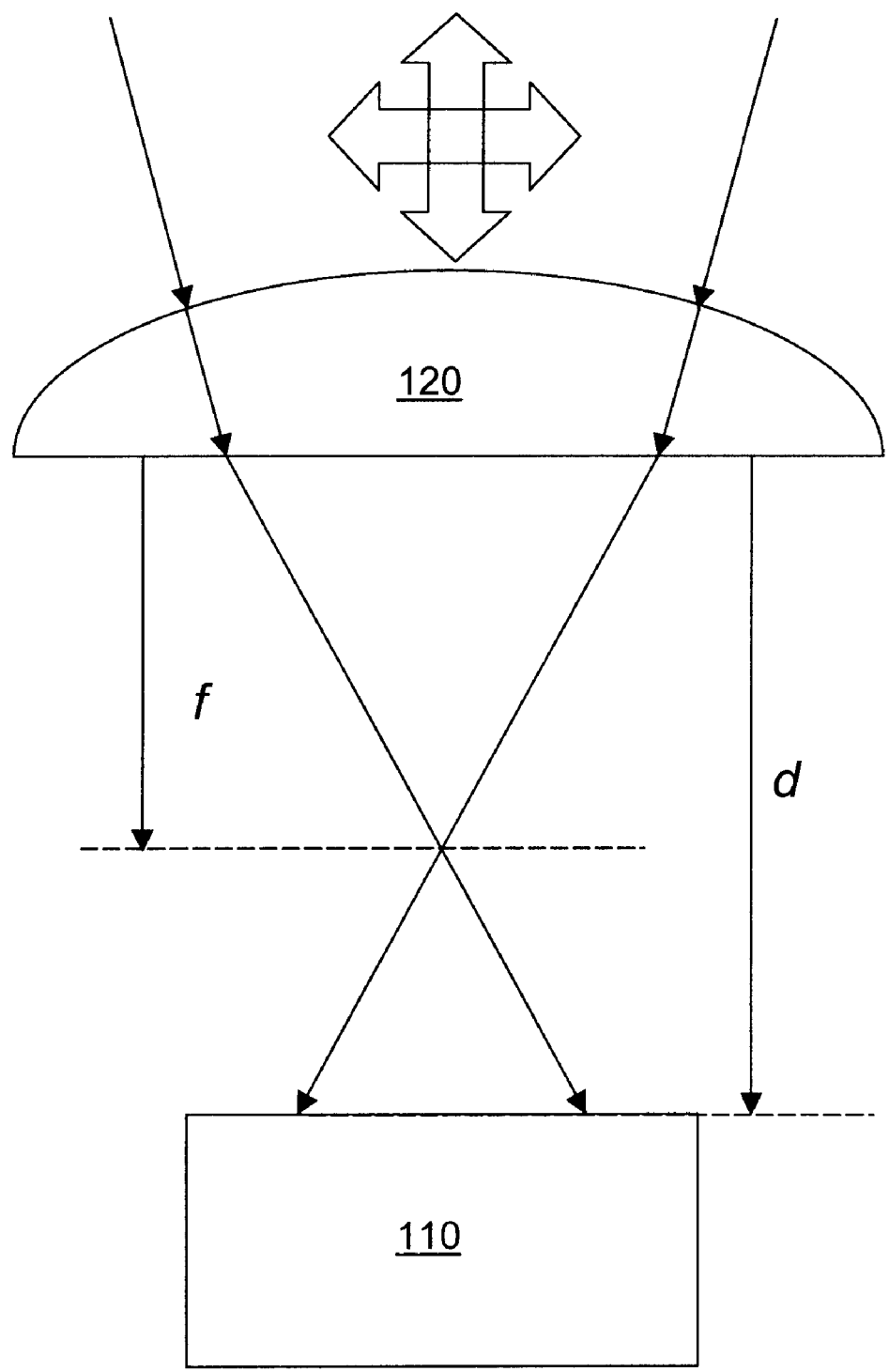
FIG. 1 is a vertical cross-sectional view of an exemplary prior art optical structure.

As stated above, the present invention relates to a lens structure having an axially and laterally variable focal point, and methods of operating the same. As used herein, when introducing elements of the present invention or the preferred embodiments thereof, the articles "a", "an", "the" and "said" are intended to mean that there are one or more of the elements. Throughout the drawings, the same reference numerals or letters are used to designate like or equivalent elements. Detailed descriptions of known functions and constructions unnecessarily obscuring the subject matter of the present invention have been omitted for clarity. The drawings are not necessarily drawn to scale.

Figure 2A:
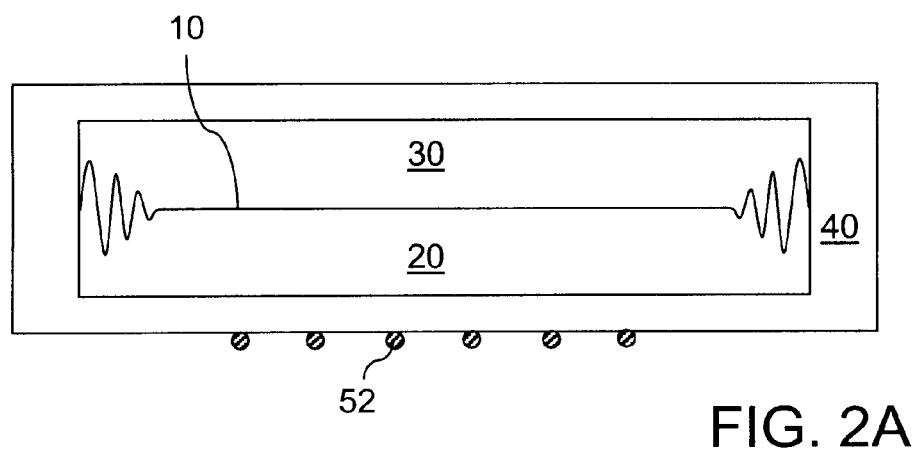
FIG. 2A is a vertical cross-sectional view of a first exemplary optical structure according to a first embodiment of the present invention.
Figure 2B:
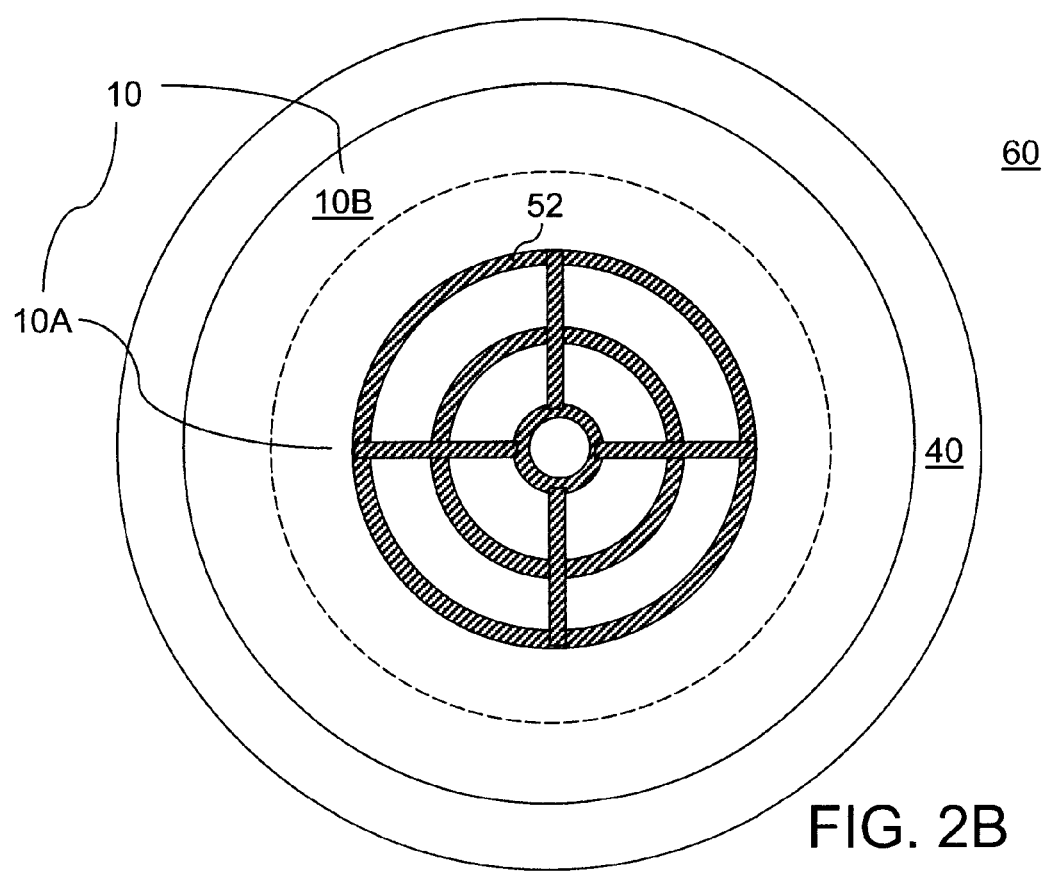
FIG. 2B is a bottom-up view of the first exemplary optical structure according to the first embodiment of the present invention.

Referring to FIGS. 2A and 2B, a first exemplary optical structure according to a first embodiment of the present invention comprises an enclosure 40, which comprises a transparent upper surface and a transparent lower surface. FIG. 2A is a vertical cross-sectional view of the first exemplary optical structure, which functions as a lens, and FIG. 2B is a bottom-up view of the first exemplary optical structure. A transparent membrane 10 is provided within the enclosure 40 so that the volume within the enclosure 40 is divided into an upper tank portion 30 and a lower tank portion 20.

While the embodiments of the present invention are described employing an enclosure 40 having a shape of a circular disk, it should be obvious to one skilled in the art that any cross-sectional shape may be employed for the enclosure 40 such as a square, a rhombus, a rectangle, a parallelogram, a trapezoid, a quadrilateral, a regular polygon, an irregular polygon, an ellipse, a curvilinear shape, or any closed two dimensional shape having straight and/or curved edge portions. Further, while the embodiments of the present invention are described employing an enclosure 40 having a flat top surface and a flat bottom surface, it should be obvious to one skilled in the art that the top surface and/or the bottom surface of the enclosure 40 may have a curvilinear surface including concave and convex surfaces. Yet further, while the embodiment of the present invention are described with an enclosure 40 having a constant thickness at the planar portions, i.e., the top portions and the bottom portions, of the enclosure 40, it should be obvious to one skilled in the art that a lens may be incorporated into the top portion and/or the bottom portion of the enclosure 40. Such variations are explicitly contemplated herein.

The upper tank portion 30 is filled with a first fluid having a first refractive index. Preferably, the entirety of the upper tank portion 30 is filled with the first fluid to reduce undesirable motion of the first fluid in case the enclosure 40 is subjected to any movement. The lower tank portion 20 is filled with a second fluid having a second refractive index. Preferably, the entirety of the lower tank portion 20 is filled with the second fluid to reduce undesirable motion of the second fluid in case the enclosure 40 is subjected to any movement.

The first exemplary optical structure is transparent to radiation in at least one wavelength range of electromigration, which may be the visible spectrum, the wavelength range of infrared light, the wavelength range of ultraviolet light, a microwave wavelength range, or a portion and/or a combination thereof along the direction from the transparent upper surface to the transparent lower surface. Each of the first fluid, the second fluid, the transparent membrane 10, and the material comprising the transparent upper surface and the transparent lower surface of the enclosure is transparent in the at least one wavelength range.

The dimensions of the first exemplary optical structure may vary depending on applications. Lateral dimensions, e.g., the diameter, of the first exemplary optical structure may be from about 100 nm for Micro-Electro-Mechanical Systems (MEMS) applications to about 1 meter for macroscopic applications, although lesser and greater dimensions are contemplated herein also. The thickness, i.e., the distance between the transparent upper surface and the transparent lower surface, of the first exemplary optical structure may be from about 20 nm for Micro-Electro-Mechanical Systems (MEMS) applications to about 10 cm for macroscopic applications, although lesser and greater thicknesses are contemplated herein also.

Non-limiting exemplary materials that may be employed for the transparent upper surface and the transparent lower surface of the enclosure 40 include silicate glass, plastics, aluminum oxide, lucite, nylon, obsidian, plexiglas, spinel, zircon, beryl, diamond, dielectric oxide of metals and semiconductors, dielectric nitride of metals and semiconductors, etc. provided that the material is transparent to radiation in the at least one wavelength range of electromigration of concern at the thicknesses of the transparent upper surface and the transparent lower surface. Typically, the material and thickness for the transparent upper surface and the transparent lower surface are determined based on the degree of transparency required for the application of the first exemplary optical structure and the mechanical strength that the first exemplary optical structure needs to bear.

While the present invention is described with the first exemplary optical structure having a shape of a circular disk having flat surfaces for the transparent upper surface and the transparent lower surface and having a cylindrical sidewall laterally surrounding the upper tank portion 30 and the lower tank portion 20 and connecting the transparent upper surface and the transparent lower surface, variations of the first embodiment are explicitly contemplated herein. Such variations include embodiments in which any arbitrary shape is employed as a horizontal cross-sectional area of an optical structure, embodiments in which a concave or a convex surface is employed for the transparent upper surface and the transparent lower surface, embodiments in which the sidewall is not present and the transparent upper surface is directly joined to the transparent lower surface, and embodiment in which a set of a plurality of sidewalls are employed to laterally surround the upper tank portion 30 and the lower tank portion 20.

The transparent membrane 10 is also transparent to radiation in the at least one wavelength range of electromigration of concern. Non-limiting exemplary materials for the transparent membrane 10 include plastic films, cellophane films, vinyl films, and any other conductive or non-conductive film that is transparent to radiation in the at least one wavelength range of electromigration of concern and capable of holding an electrostatic charge. The transparent membrane 10 is charged with electrostatic charge during manufacturing steps, for example, by temporarily connecting to an electrostatically charged material or a charge source such as a node of an electrically charged capacitor. After the manufacture, the enclosure 40 provides electrical isolation of the transparent membrane 10 from the environment so that the electrostatic charge stored in the transparent membrane 10 does not escape from the transparent membrane during the operation of the first exemplary optical structure. Alternatively, one end of a lead wire (not shown) may be attached to the transparent membrane 10 and the other end may be exposed on a surface of the enclosure to enable recharging of the transparent membrane 10 with an electrostatic charge as needed.

In the absence of external force applied to the transparent membrane 10, the transparent membrane is taut without wrinkles. Preferably, the transparent membrane 10 is planar in the absence of external forces other than gravitational forces and inertia related forces. In one case, the entirety of the transparent membrane 10 may comprise a planar sheet. In another case, the transparent membrane 10 comprises a planar central membrane portion 10A and an elastic circumferential membrane portion 10B. The dotted circle in FIG. 2B represents the boundary between the planar central membrane portion 10A and the elastic circumferential membrane portion 10B. The elastic circumferential membrane portion B adjoins the entirety of the periphery of the planar central membrane portion 10A. Further, the entirety of the periphery of the elastic circumferential membrane portion B is adjoined to an inner sidewall of the enclosure 40. The transparent membrane 10 provides a fluid-tight seal between the upper tank portion 30 and the lower tank portion 20 so that the first fluid stays only within the upper tank portion 30 and the second fluid stays only in the lower tank portion 20.

Preferably, the first fluid and the second fluid are non-conductive to prevent dissipation of the electrostatic charge on the transparent membrane 10 through the first fluid or the second fluid. Alternately, the first fluid and/or the second fluid may provide limited level of conduction between the transparent membrane 10 and the enclosure 40. In this case, the depletion of charge from the transparent membrane 10 may be replenished by constant charging, e.g., a fixed electrical connection to a charge source, or an intermittent charging, e.g., a periodic electrical connection to a charge source. Such variations are explicitly contemplated herein. The first fluid and the second fluid are selected from fluids that do not dissolve the material of the transparent membrane 10 or the material of the enclosure.

The first fluid and the second fluid are selected as a pair of fluids having different refractive indices. Non-limiting examples of materials that may be employed as a first fluid or a second fluid include polypropylene (refractive index: 1.36), ethyl alcohol (refractive index: 1.36), methyl alcohol (refractive index: 1.329), glycerin (refractive index: 1.473), 13% water content honey (refractive index: 1.504), clove oil (refractive index: 1.535), sunflower oil (refractive index: 1.466), vegetable oil (refractive index: 1.47), oil of wintergreen (refractive index: 1.536), acetone (refractive index: 1.36), water (refractive index: 1.33283 at 20° C.), etc. The first fluid and/or the second fluid may be a gas. For example, air (refractive index: 1.00) may be employed as one of the first fluid and the second fluid.

The first exemplary optical structure is provided with a means for inducing non-planar inflection of the transparent membrane 10, which comprises at least one enclosure-side conductive structure which abuts the enclosure 40. Particularly, the at least one enclosure-side conductive structure comprises a mesh of conductive wires 52 that is located directly on the transparent lower surface of the enclosure. The at least one enclosure-side conductive structure, i.e., the mesh of conductive wires 52, is substantially transparent. In one case, the material of the mesh of conductive wires 52 is intrinsically transparent, i.e., transparent irrespective of the thickness of the wires of mesh of conductive wires 52 by virtue of the material property. In another case, the mesh of conductive wires 52 is substantially transparent because the wires in the mesh of conductive wires 52 are thin enough, e.g., less than the absorption length of the material of the mesh of conductive wires 52. In yet another case, the mesh of conductive wires 52 is substantially transparent by limiting the area covered by the mesh of conductive wires 52 although the wires of the mesh of conductive wires 52 are not intrinsically transparent. For example, the area occupied by the mesh of conductive wires 52 may be less than 1%, and preferably less than 0.1% of the area of an optically active portion of the transparent lower surface.

By applying an electrical bias to the mesh of conductive wires 52, electrostatic force is applied to the transparent membrane 10. By forming the mesh of conductive wires 52 underneath a portion of the transparent membrane 10 which is less than the entirety of the area of the planar central membrane portion 10A, e.g., only around the center of the transparent lower surface, the transparent membrane 10 may be pulled directly above the mesh of conductive wires 52, i.e., the transparent membrane 10 is inflected due to an electrostatic force.

During the inflection of the transparent membrane 10, the volume of the first fluid and the volume of the second fluid remain unchanged. Only the shape of the upper tank portion 30 and the shape of the lower tank portion 20 are changed as the transparent membrane 10, which serves as the boundary between the upper tank portion 30 and the shape of the lower tank portion 20, inflects vertically and/or twists.

In a variation of the first exemplary optical structure, the mesh of conductive wires 52 may be formed directly on the transparent upper surface instead of the transparent lower surface. Inflection of the transparent membrane 10 may be induced in the same manner through electrostatic means. In another variation of the first exemplary optical structure, a pair of meshes of conductive wires 52 may be formed directly on the transparent upper surface and the transparent lower surface. The pairs of meshes of conductive wires may be oppositely biased to induce amplified inflection of the transparent membrane 10 through electrostatic means.

Figure 3A:
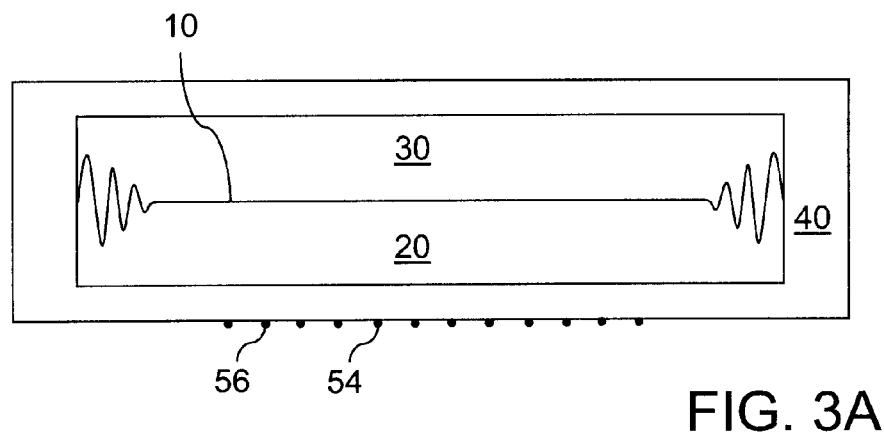
FIG. 3A is a vertical cross-sectional view of a second exemplary optical structure according to a second embodiment of the present invention.
Figure 3B:
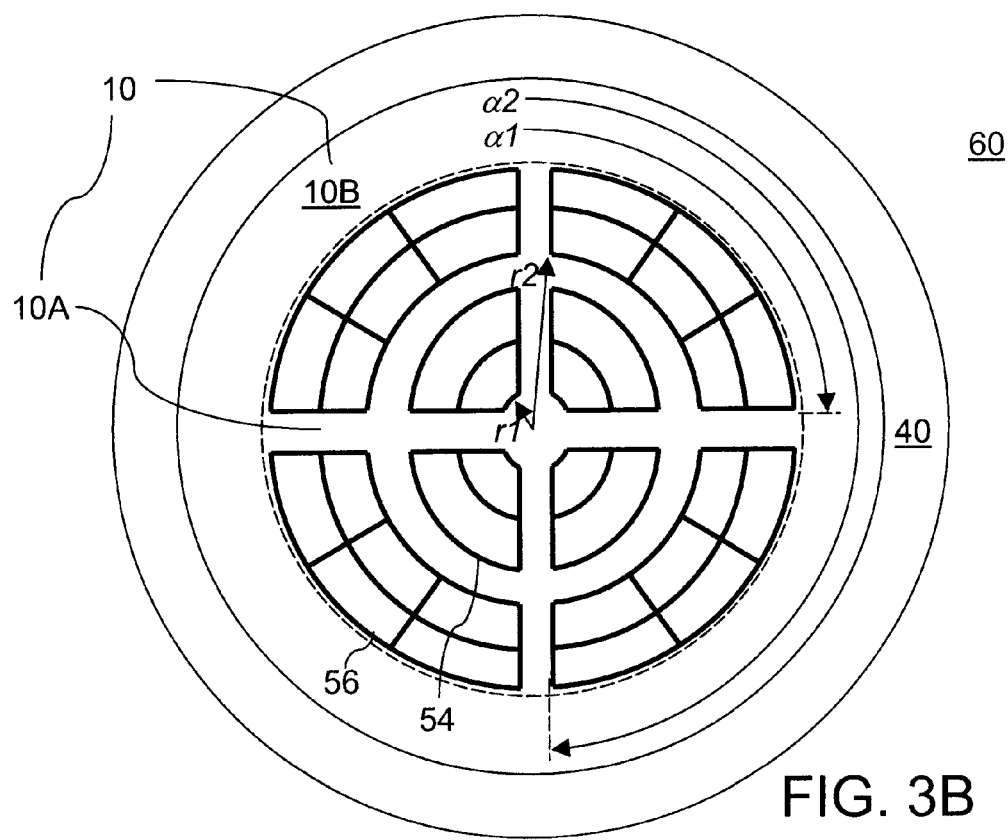
FIG. 3B is a bottom-up view of the second exemplary optical structure according to the second embodiment of the present invention.

Referring to FIGS. 3A and 3B, a second exemplary optical structure according to a second embodiment of the present invention comprises an enclosure 40, a transparent membrane 10, an upper tank portion 30, and a lower tank portion 20, which have the same structure and have the same composition as in the first embodiment. The first fluid in the upper tank portion 30 and the second fluid in the lower tank portion 20 are the same as in the first embodiment. FIG. 3A is a vertical cross-sectional view of the second exemplary optical structure, which functions as a lens, and FIG. 3B is a bottom-up view of the second exemplary optical structure.

The second exemplary optical structure further comprises at least one enclosure-side conductive structure located directly on the transparent lower surface of the enclosure 40. The at least one enclosure-side conductive structure comprises a conductive wire mesh array including an inner conductive wire mesh array 54 located at a first distance from the center of the transparent lower surface and an outer conductive wire mesh array 56 located at a second distance from the center of the transparent lower surface. In a non-limiting example, the inner conductive wire mesh array 54 may be located at a first radius r1 from the center of the transparent lower surface and the outer conductive wire mesh array 56 may be located at a second radius r2 from the center of the transparent lower surface. The second radius r2 is greater than the first radius r1 and the outer conductive wire mesh array 56 is disjoined from the inner conductive wire mesh array 54.

In general, the at least one enclosure-side conductive structure comprises at least two groups of enclosure-side conductive structures having different radial distance from, or having a different azimuthal angle about, the center of the transparent upper surface or a center of the transparent lower surface in the second embodiment.

Each of the inner conductive wire mesh array 54 and the outer conductive wire mesh array 56 may comprise at least two conductive wire meshes having different azimuthal angles around the center of the transparent upper surface or the center of the transparent lower surface. For example, one conductive wire mesh of the outer conductive wire mesh array 56 may have a first azimuthal angle $\alpha 1$ and another conductive wire mesh of the outer conductive wire mesh array 56 may have a second azimuthal angle $\alpha 2$, in which the second azimuthal angle $\alpha 2$ is different from the first azimuthal angle $\alpha 1$. In one case, the inner conductive wire mesh array 54 may comprise m identical instances of a unit conductive wire mesh azimuthally displaced from a neighboring unit by $2\pi/m$ radians, wherein m is a positive integer greater than 1. In another case, the outer conductive wire mesh array 56 may comprise n identical instances of a unit conductive wire mesh azimuthally displaced from a neighboring unit by $2\pi/n$ radians, wherein n is a positive integer greater than 1.

The at least one enclosure-side conductive structure, i.e., the inner conductive wire mesh array 54 and the outer conductive wire mesh array 56, is substantially transparent. In one case, the material of the inner conductive wire mesh array 54 and the outer conductive wire mesh array 56 is intrinsically transparent, i.e., transparent irrespective of the thickness of the wires in the inner conductive wire mesh array 54 and the outer conductive wire mesh array 56 by virtue of the material property. In another case, the inner conductive wire mesh array 54 and the outer conductive wire mesh array 56 are substantially transparent because the wires in the inner conductive wire mesh array 54 and the outer conductive wire mesh array 56 are thin enough, e.g., less than the absorption length of the material of the inner conductive wire mesh array 54 and the outer conductive wire mesh array 56. In yet another case, the inner conductive wire mesh array 54 and the outer conductive wire mesh array 56 are substantially transparent by limiting the area covered by the inner conductive wire mesh array 54 and the outer conductive wire mesh array 56 although the wires therein are not intrinsically transparent. For example, the area occupied by the inner conductive wire mesh array 54 and the outer conductive wire mesh array 56 may be less than 1%, and preferably less than 0.1% of the area of an optically active portion of the transparent lower surface.

In general, the at least two groups of enclosure-side conductive structures comprise an array of conductive wire meshes, which may be a radial array in which different conductive wire meshes are radially distributed, an azimuthal array in which different conductive wire meshes are azimuthally distributed, a radial and azimuthal array in which different conductive wire meshes are radially and azimuthally distributed, a linear array in which different conductive wire meshes are distributed along one direction, a two-dimensional rectangular array in which different conductive wire meshes are distributed in a two-dimensional array, or any other array configuration including an irregular array.

The array of conductive wire meshes may cover the entirety, or a portion of, the area of the transparent lower surface. By charging the transparent membrane 10 either during a manufacturing step or through a lead wire as described above and by applying a pattern of electrical bias voltage to the array of conductive wire meshes, electrostatic force is applied to the transparent membrane 10 in various modes. In one case, the entirety of the planar central membrane portion 10A may be pulled by the array of conductive wire meshes. In another case, the planar central membrane portion 10A may be inflected with at least one radial node, e.g., the center portion of the planar central membrane portion 10A may be pulled, while a peripheral portion of the planar central membrane portion 10A may be moved away. In yet another case, the planar central membrane portion 10A may be inflected with at least one azimuthal node, e.g., a left portion of the planar central membrane portion 10A may be pulled, while a right portion of the planar central membrane portion 10A may be moved away. In still another case, the planar central membrane portion 10A may be inflected with at least one radial node and at least one azimuthal node.

During the inflection of the transparent membrane 10, the volume of the first fluid and the volume of the second fluid remain unchanged. Only the shape of the upper tank portion 30 and the shape of the lower tank portion 20 are changed as in the first embodiment.

In a variation of the second exemplary optical structure, the array of conductive wire meshes may be formed directly on the transparent upper surface instead of the transparent lower surface. Inflection of the transparent membrane 10 may be induced in the same manner through electrostatic means. In another variation of the second exemplary optical structure, a pair of arrays of conductive wire meshes may be formed directly on the transparent upper surface and the transparent lower surface. The pair of arrays of conductive wire meshes may be oppositely biased to induce amplified inflection of the transparent membrane 10 through electrostatic means.

Figure 4A:
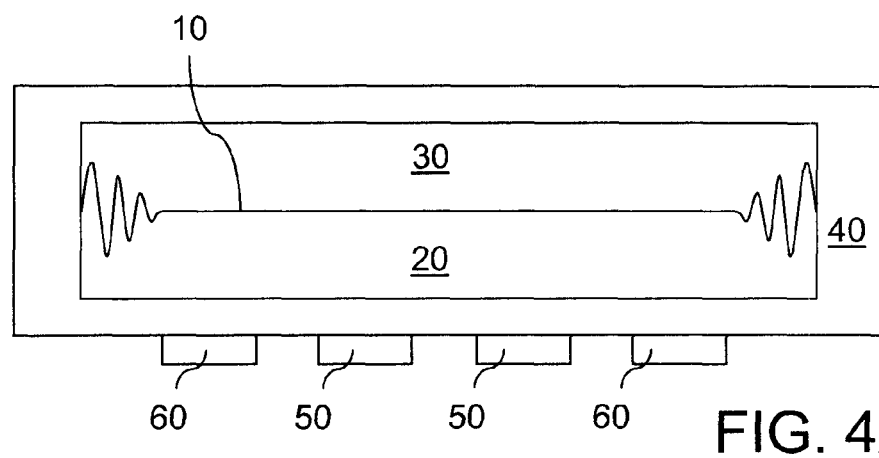
FIG. 4A is a vertical cross-sectional view of a third exemplary optical structure according to a third embodiment of the present invention.
Figure 4B:
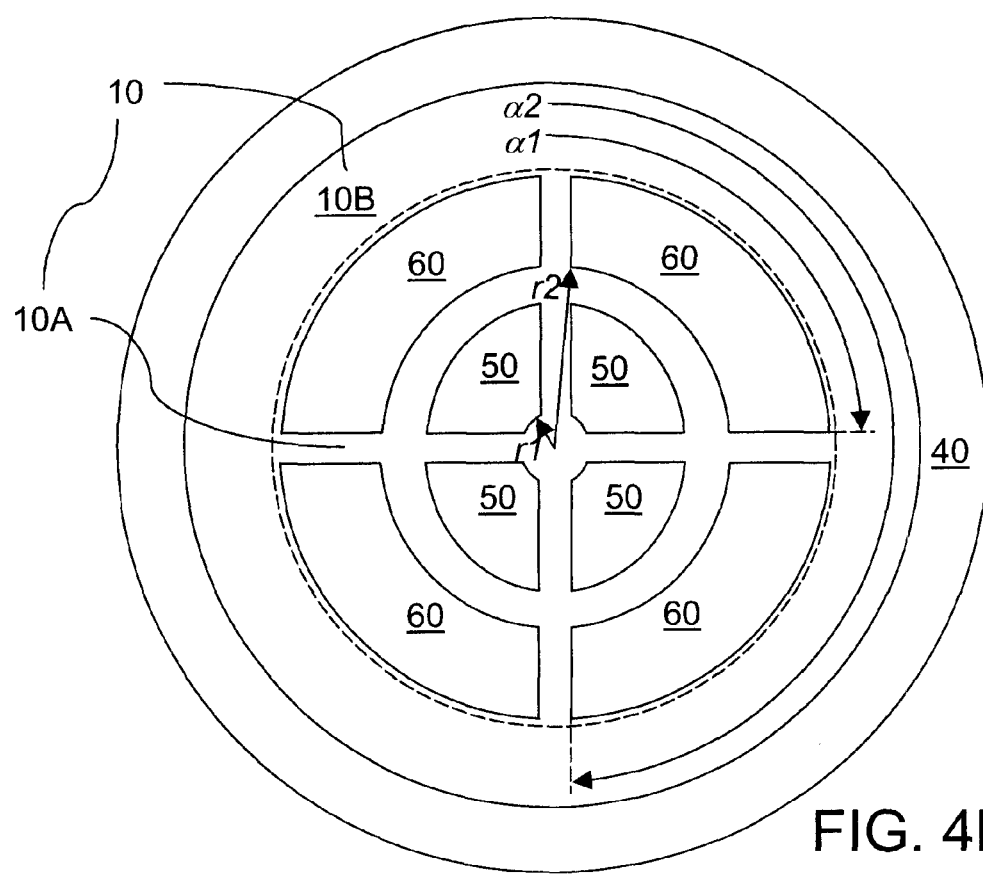
FIG. 4B is a bottom-up view of the third exemplary optical structure according to the third embodiment of the present invention.

Referring to FIGS. 4A and 4B, a third exemplary optical structure according to a third embodiment of the present invention comprises an enclosure 40, a transparent membrane 10, an upper tank portion 30, and a lower tank portion 20, which have the same structure and have the same composition as in the first embodiment. The first fluid in the upper tank portion 30 and the second fluid in the lower tank portion 20 are the same as in the first embodiment. FIG. 4A is a vertical cross-sectional view of the third exemplary optical structure, which functions as a lens, and FIG. 4B is a bottom-up view of the third exemplary optical structure.

The third exemplary optical structure further comprises at least one enclosure-side conductive structure located directly on the transparent lower surface of the enclosure 40. The at least one enclosure-side conductive structure comprises an array of transparent conductive plates including an inner array of transparent conductive plates 50 located at a first distance from the center of the transparent lower surface and an outer array of transparent conductive plates 60 located at a second distance from the center of the transparent lower surface. In a non-limiting example, the inner array of transparent conductive plates 50 may be located at a first radius r1 from the center of the transparent lower surface and the outer array of transparent conductive plates 60 may be located at a second radius r2 from the center of the transparent lower surface. The second radius r2 is greater than the first radius r1 and the outer array of transparent conductive plates 60 is disjoined from the inner array of transparent conductive plates 50.

In general, the at least one enclosure-side conductive structure comprises at least two groups of enclosure-side conductive structures having different radial distance from, or having a different azimuthal angle about, the center of the transparent upper surface or a center of the transparent lower surface in the third embodiment.

Each of the inner array of transparent conductive plates 50 and the outer array of transparent conductive plates 60 may comprise at least two transparent conductive plates having different azimuthal angles around the center of the transparent upper surface or the center of the transparent lower surface. For example, one transparent conductive plate of the outer array of transparent conductive plates 60 may have a first azimuthal angle $\alpha 1$ and another transparent conductive plate of the outer array of transparent conductive plates 60 may have a second azimuthal angle $\alpha 2$, in which the second azimuthal angle $\alpha 2$ is different from the first azimuthal angle $\alpha 1$. In one case, the inner array of transparent conductive plates 50 may comprise m identical instances of a unit transparent conductive plate azimuthally displaced from a neighboring unit by $2\pi/m$ radians, wherein m is a positive integer greater than 1. In another case, the outer array of transparent conductive plates 60 may comprise n identical instances of a unit transparent conductive plate azimuthally displaced from a neighboring unit by $2\pi/n$ radians, wherein n is a positive integer greater than 1.

The at least one enclosure-side conductive structure, i.e., the inner array of transparent conductive plates 50 and the outer array of transparent conductive plates 60, is substantially transparent. In one case, the material of the inner array of transparent conductive plates 50 and the outer array of transparent conductive plates 60 is intrinsically transparent, i.e., transparent irrespective of the thickness of the transparent conductive plates in the inner array of transparent conductive plates 50 and the outer array of transparent conductive plates 60 by virtue of the material property. In another case, the inner array of transparent conductive plates 50 and the outer array of transparent conductive plates 60 are substantially transparent because the transparent conductive plates are thin enough, e.g., less than the absorption length of the material of the inner array of transparent conductive plates 50 and the outer array of transparent conductive plates 60.

In general, the at least two groups of enclosure-side conductive structures comprise an array of transparent conductive plates, which may be a radial array in which different conductive transparent conductive plates are radially distributed, an azimuthal array in which different transparent conductive plates are azimuthally distributed, a radial and azimuthal array in which different transparent conductive plates are radially and azimuthally distributed, a linear array in which different transparent conductive plates are distributed along one direction, a two-dimensional rectangular array in which different transparent conductive plates are distributed in a two-dimensional array, or any other array configuration including an irregular array.

The array of transparent conductive plates may cover the entirety, or a portion of, the area of the transparent lower or upper surface. By charging the transparent membrane 10 either during a manufacturing step or through a lead wire as described above and by applying a pattern of electrical bias voltage to the array of transparent conductive plates, electrostatic force is applied to the transparent membrane 10 in various modes. In one case, the entirety of the planar central membrane portion 10A may be pulled by the array of transparent conductive plates. In another case, the planar central membrane portion 10A may be inflected with at least one radial node, e.g., the center portion of the planar central membrane portion 10A may be pulled while a peripheral portion of the planar central membrane portion 10A may be pulled in the other direction by a charge on the other side. In yet another case, the planar central membrane portion 10A may be inflected with at least one azimuthal node, e.g., a left portion of the planar central membrane portion 10A may be pulled while a right portion of the planar central membrane portion 10A may be pulled in the other direction by a charge on the other side. In still another case, the planar central membrane portion 10A may be inflected with at least one radial node and at least one azimuthal node.

During the inflection of the transparent membrane 10, the volume of the first fluid and the volume of the second fluid remain unchanged. Only the shape of the upper tank portion 30 and the shape of the lower tank portion 20 are changed as in the first embodiment.

In a variation of the third exemplary optical structure, the array of transparent conductive plates may be formed directly on the transparent upper surface instead of the transparent lower surface. Inflection of the transparent membrane 10 may be induced in the same manner through electrostatic means. In another variation of the third exemplary optical structure, a pair of arrays of transparent conductive plates may be formed directly on the transparent upper surface and the transparent lower surface. The pair of arrays of transparent conductive plates may be oppositely biased to induce amplified inflection of the transparent membrane 10 through electrostatic means.

Figure 5A:
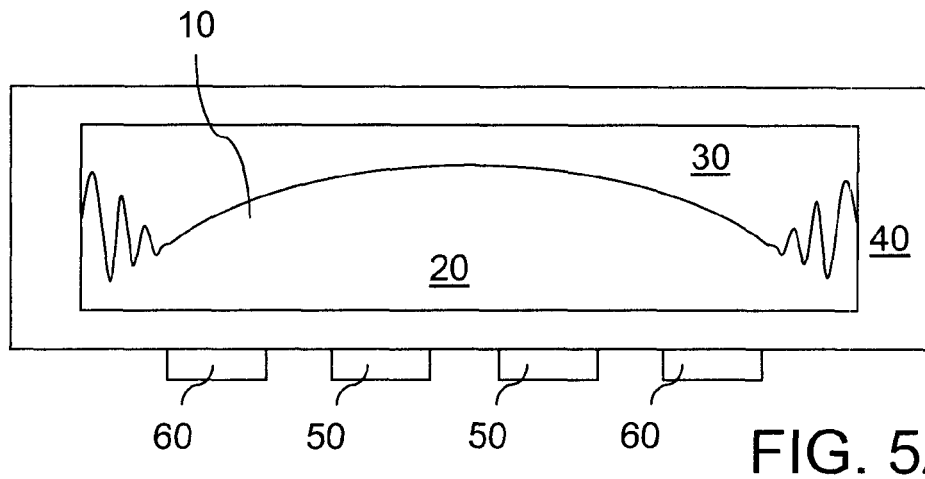
FIGS. 5A-5C are vertical cross-sectional views of the third exemplary optical structure while a transparent membrane 10 is under electrostatic inflection.

Referring to FIG. 5A, a vertical cross-sectional view of the third exemplary optical structure is shown for a mode of operation in which the transparent membrane 10 is electrostatically inflected. In this case, the transparent membrane 10 is pre-charged with an electrostatic charge, i.e., with electrons or holes, either during a manufacturing step or through a lead wire (not shown) connected to the transparent membrane 10. A voltage having the same polarity as the electrostatic charge in the transparent membrane 10 is applied to the inner array of transparent conductive plates 50, while a voltage having an opposite polarity of the electrostatic charge in the transparent membrane 10 is applied to the outer array of transparent conductive plates 60. For example, the transparent membrane 10 may be charged with electrons, a negative voltage may be applied to the inner array of transparent conductive plates 50, and a positive voltage may be applied to the outer array of transparent conductive plates 60. Alternately, the transparent membrane 10 may be charged with holes, a positive voltage may be applied to the inner array of transparent conductive plates 50, and a negative voltage may be applied to the outer array of transparent conductive plates 60.

In this case, the peripheral portion of the planar central membrane portion 10A is pulled toward the transparent lower surface. The center portion of the planar central membrane portion moves away form the transparent lower surface since the volume of the lower tank portion 20 remains constant. The elastic circumferential membrane portion 10B, which is elastic and deforms with the peripheral portion of the planar central membrane portion 10A, is also pulled toward the transparent lower surface. The second exemplary optical structure may also be operated in the same mode. The first exemplary optical structure may also be operated in a similar manner, in which the mesh of conductive wires 52 pulls the center portion of the planar central membrane portion 10A.

Figure 5B:
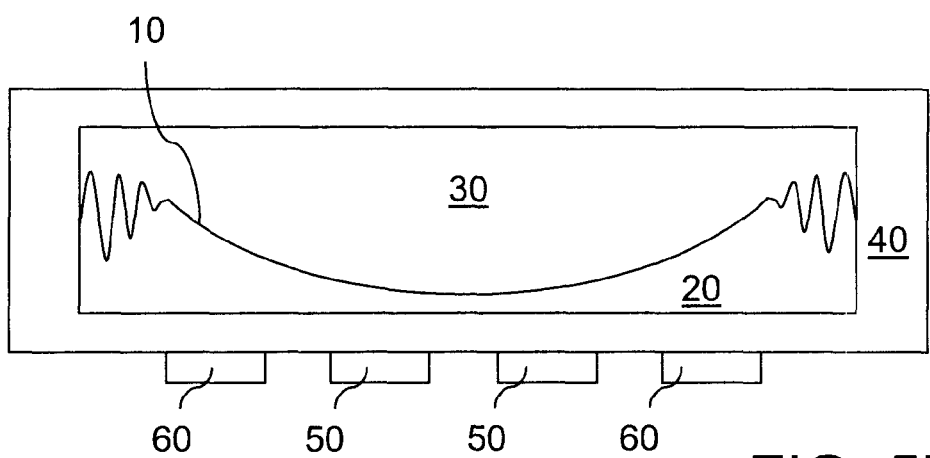

Referring to FIG. 5B, another vertical cross-sectional view of the third exemplary optical structure is shown for another mode of operation in which the transparent membrane 10 is electrostatically inflected. The transparent membrane 10 is pre-charged with an electrostatic charge as in the mode shown in FIG. 5A. A voltage having the opposite polarity of the electrostatic charge in the transparent membrane 10 is applied to the inner array of transparent conductive plates 50, while a voltage having the same polarity as the electrostatic charge in the transparent membrane 10 is applied to the outer array of transparent conductive plates 60. For example, the transparent membrane 10 may be charged with electrons, a positive voltage may be applied to the inner array of transparent conductive plates 50, and a negative voltage may be applied to the outer array of transparent conductive plates 60. Alternately, the transparent membrane 10 may be charged with holes, a negative voltage may be applied to the inner array of transparent conductive plates 50, and a positive voltage may be applied to the outer array of transparent conductive plates 60.

In this case, the center portion of the planar central membrane portion 10A is pulled toward from the transparent lower surface. The peripheral portion of the planar central membrane portion 10A moves away from the transparent lower surface since the volume of the lower tank portion 20 remains constant. The elastic circumferential membrane portion 10B, which is elastic and deforms with the peripheral portion of the planar central membrane portion 10A, moves away from the transparent lower surface. The second exemplary optical structure may also be operated in the same mode. The first exemplary optical structure may also be operated in a similar manner, in which the mesh of conductive wires 52 pulls the center portion of the planar central membrane portion 10A.

Figure 5C:
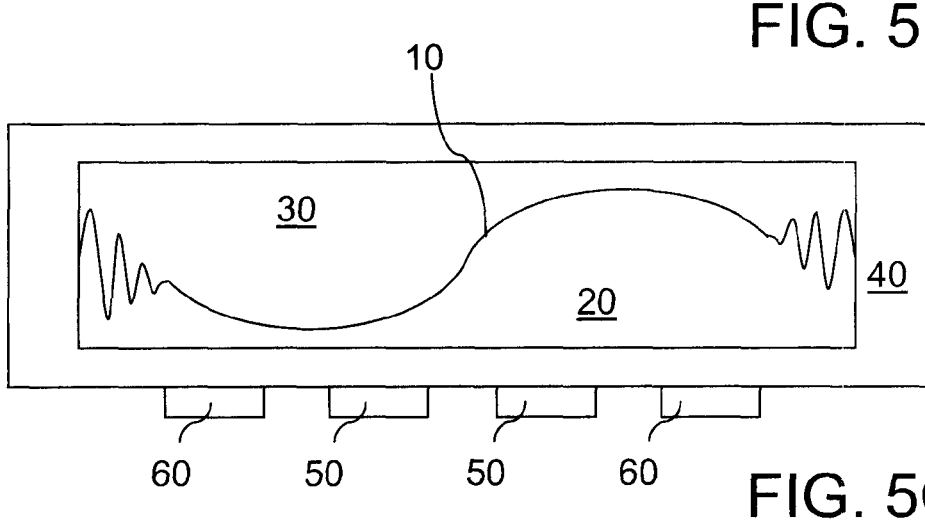

Referring to FIG. 5C, yet another vertical cross-sectional view of the third exemplary optical structure is shown for yet another mode of operation in which the transparent membrane 10 is electrostatically inflected. The transparent membrane 10 is pre-charged with an electrostatic charge as in the mode shown in FIG. 5A. A voltage having the opposite polarity of the electrostatic charge in the transparent membrane 10 is applied to the left side of the inner array of transparent conductive plates 50 and the left side of the outer array of transparent conductive plates 60, while a voltage having the same polarity as the electrostatic charge in the transparent membrane 10 is applied to the right side of the inner array of transparent conductive plates 50 and the right side of outer array of transparent conductive plates 60.

In this case, the left-side portion of the planar central membrane portion 10A is pulled toward from the transparent lower surface, while the right-side portion of the planar central membrane portion 10A moves away from the transparent lower surface since the volume of the lower tank portion 20 remains constant. The elastic circumferential membrane portion 10B, which is elastic and deforms with the peripheral portion of the planar central membrane portion 10A, is pulled toward the transparent lower surface on the left side and moves away from the transparent lower surface on the right side. The second exemplary optical structure may also be operated in the same mode.

Figure 6A:
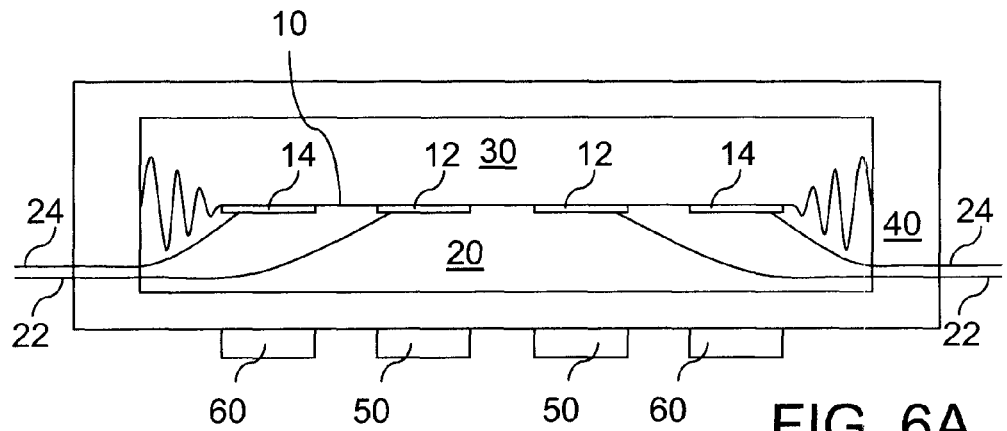
FIG. 6A is a vertical cross-sectional view of a fourth exemplary optical structure according to a fourth embodiment of the present invention.
Figure 6B:
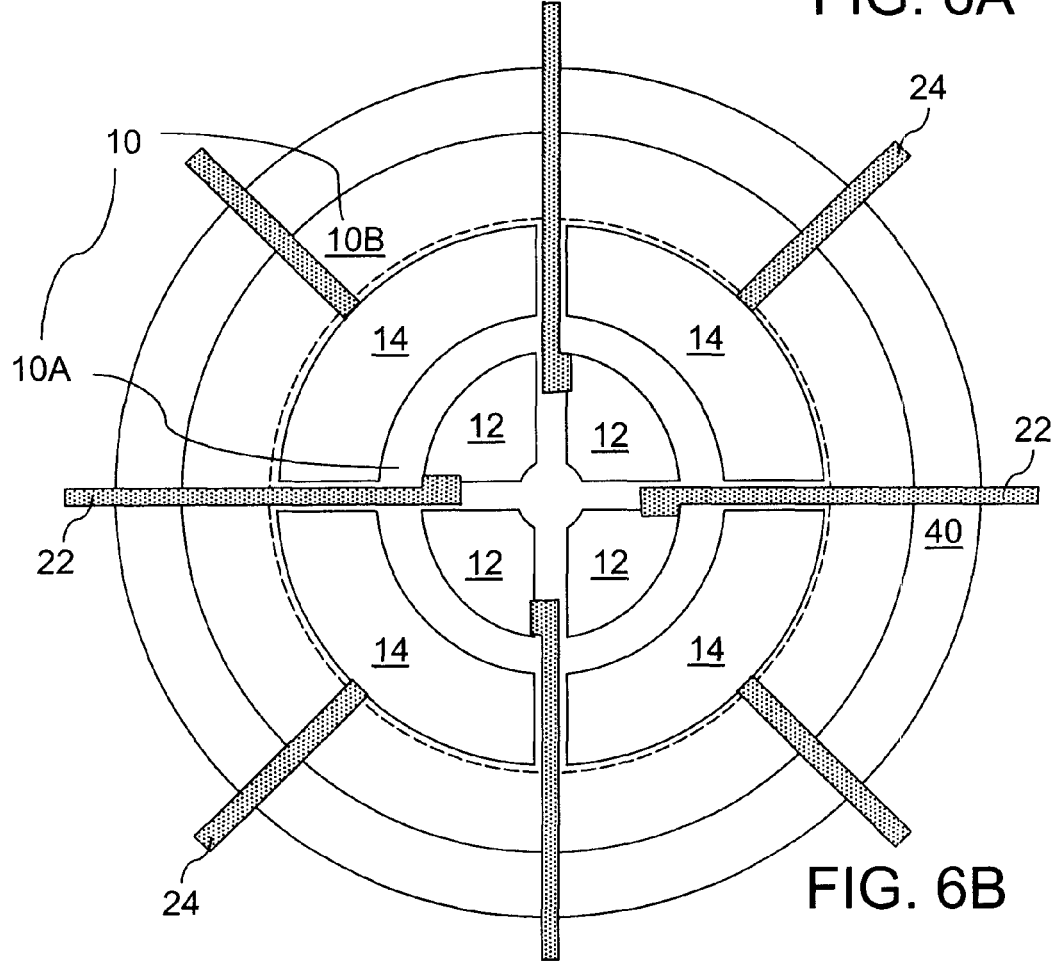
FIG. 6B is a bottom-up view of the fourth exemplary optical structure excluding an inner array of transparent conductive plates 50 and an outer array of transparent conductive plates 60 for clarity according to the fourth embodiment of the present invention.

Referring to FIGS. 6A and 6B, a fourth exemplary optical structure according to a fourth embodiment of the present invention comprises an enclosure 40, a transparent membrane 10, an upper tank portion 30, a lower tank portion 20, an inner array of transparent conductive plates 50, and an outer array of transparent conductive plates 60, which have the same structure and have the same composition as in the third embodiment. The first fluid in the upper tank portion 30 and the second fluid in the lower tank portion 20 are the same as in the first through third embodiments. FIG. 6A is a vertical cross-sectional view of the fourth exemplary optical structure, which functions as a lens, and FIG. 6B is a bottom-up view of the fourth exemplary optical structure excluding the inner array of transparent conductive plates 50 and the outer array of transparent conductive plates 60 for clarity.

The fourth exemplary optical structure further comprises at least one membrane-side conductive structure located directly on the transparent membrane 10. The at least one membrane-side conductive structure may be located on the top side or on the bottom side of the transparent membrane 10. The at least one membrane-side conductive structure comprises an array of transparent conductive plates, which are herein referred to as transparent membrane-side conductive plates, including an inner array of transparent membrane-side conductive plates 12 located at a first distance from the center of the transparent membrane 10 and an outer array of transparent membrane-side conductive plates 14 located at a second distance from the center of the transparent membrane 10. In a non-limiting example, the inner array of transparent membrane-side conductive plates 12 may be located at a first radius from the center of the transparent lower surface and the outer array of transparent membrane-side conductive plates 14 may be located at a second radius from the center of the transparent membrane 10. The second radius is greater than the first radius and the outer array of transparent membrane-side conductive plates 14 is disjoined from the inner array of transparent membrane-side conductive plates 12.

In general, the at least one membrane-side conductive structure comprises at least two groups of membrane-side conductive structures having different radial distance from the center of the transparent membrane 10 or having a different azimuthal angle about the center of the transparent membrane 10 in the fourth embodiment.

Each of the inner array of transparent membrane-side conductive plates 12 and the outer array of transparent membrane-side conductive plates 14 may comprise at least two transparent membrane-side conductive plates having different azimuthal angles around the center of the transparent membrane 10. In one case, the inner array of transparent membrane-side conductive plates 12 may comprise m identical instances of a unit transparent membrane-side conductive plate azimuthally displaced from a neighboring unit by $2\pi/m$ radians, wherein m is a positive integer greater than 1. In another case, the outer array of transparent membrane-side conductive plates 14 may comprise n identical instances of a unit transparent membrane-side conductive plate azimuthally displaced from a neighboring unit by $2\pi/n$ radians, wherein n is a positive integer greater than 1.

The at least one membrane-side conductive structure, i.e., the inner array of transparent membrane-side conductive plates 12 and the outer array of transparent membrane-side conductive plates 14, is substantially transparent. In one case, the material of the inner array of transparent membrane-side conductive plates 12 and the outer array of transparent membrane-side conductive plates 14 is intrinsically transparent, i.e., transparent irrespective of the thickness of the transparent membrane-side conductive plates in the inner array of transparent membrane-side conductive plates 12 and the outer array of transparent membrane-side conductive plates 14 by virtue of the material property. In another case, the inner array of transparent membrane-side conductive plates 12 and the outer array of transparent membrane-side conductive plates 14 are substantially transparent because the transparent membrane-side conductive plates are thin enough, e.g., less than the absorption length of the material of the inner array of transparent membrane-side conductive plates 12 and the outer array of transparent membrane-side conductive plates 14.

In general, the at least two groups of membrane-side conductive structures comprise an array of transparent membrane-side conductive plates, which may be a radial array in which different conductive membrane-side transparent conductive plates are radially distributed, an azimuthal array in which different transparent membrane-side conductive plates are azimuthally distributed, a radial and azimuthal array in which different transparent membrane-side conductive plates are radially and azimuthally distributed, a linear array in which different transparent membrane-side conductive plates are distributed along one direction, a two-dimensional rectangular array in which different transparent membrane-side conductive plates are distributed in a two-dimensional array, or any other array configuration including an irregular array.

The array of transparent membrane-side conductive plates may cover the entirety, or a portion of, the area of the transparent membrane 10. Electrical bias to the array of transparent membrane-side conductive plates, e.g., the inner array of transparent membrane-side conductive plates 12 and the outer array of transparent membrane-side conductive plates 14, is provided by conductive wires, each of which is attached to one of the transparent membrane-side conductive plates in the array of the transparent membrane-side conductive plates. For example, the conductive wires may comprise a first set of conductive wires 22 connected to the inner array of transparent membrane-side conductive plates 12 and a second set of conductive wires 24 connected to the outer array of transparent membrane-side conductive plates 14. Each plate in the inner array of transparent membrane-side conductive plates 12 and the outer array of transparent membrane-side conductive plates 14 may be independently biased to enable various modes of inflection of the transparent membrane 10. Some of the plates may be commonly biases in some applications. The conductive wires may, or may not be transparent. Preferably, the conductive wires are transparent to enable a high transmission coefficient through the fourth exemplary optical structure.

An electrostatic force may be applied to the transparent membrane 10 in various modes as in the case of the first through third exemplary optical structures including the inflection modes described in FIGS. 5A-5C. As in the first through third embodiments, the volume of the first fluid and the volume of the second fluid remain unchanged during the inflection of the transparent membrane 10. Only the shape of the upper tank portion 30 and the shape of the lower tank portion 20 are changed as in the first through third embodiments.

In a variation of the fourth embodiment, the inner array of transparent conductive plates 50 and an outer array of transparent conductive plates 60 may be replaced with an array of conductive wire meshes of the second embodiment or a conductive wire mesh of the first embodiment.

Referring to FIGS. 7A and 7B, a fifth exemplary optical structure according to a fifth embodiment of the present invention comprises an enclosure 40, a transparent membrane 10, an upper tank portion 30, a lower tank portion 20, an inner array of transparent conductive plates 50, an outer array of transparent conductive plates 60, an inner array of transparent membrane-side conductive plates 12, and an outer array of transparent membrane-side conductive plates 14, which have the same structure and have the same composition as in the fourth embodiment. The first fluid in the upper tank portion 30 and the second fluid in the lower tank portion 20 are the same as in the first through fourth embodiments. FIG. 7A is a vertical cross-sectional view of the fifth exemplary optical structure, which functions as a lens, and FIG. 7B is a top-down view of the fifth exemplary optical structure. Conductive wires connected to the inner array of transparent membrane-side conductive plates 12 and the outer array of transparent membrane-side conductive plates 14 are omitted in FIG. 7B for clarity.

In the fifth exemplary optical structure, another at least one enclosure-side conductive structure is formed directly on the transparent upper surface of the enclosure 40 The other at least one enclosure-side conductive structure may comprise another array of transparent conductive plates including another inner array of transparent conductive plates 70 located at a first distance from the center of the transparent upper surface and another outer array of transparent conductive plates 80 located at a second distance from the center of the transparent upper surface. In a non-limiting example, the other inner array of transparent conductive plates 70 may be located at a first radius from the center of the transparent upper surface and the other outer array of transparent conductive plates 80 may be located at a second radius from the center of the transparent upper surface. The second radius is greater than the first radius and the other outer array of transparent conductive plates 80 is disjoined from the other inner array of transparent conductive plates 70.

In general, the other at least one enclosure-side conductive structure comprises at least two groups of enclosure-side conductive structures having different radial distance from, or having a different azimuthal angle about, the center of the transparent upper surface in the fifth embodiment.

Each of the other inner array of transparent conductive plates 70 and the other outer array of transparent conductive plates 80 may comprise at least two transparent conductive plates having different azimuthal angles around the center of the transparent upper surface. In one case, the other inner array of transparent conductive plates 70 may comprise m' identical instances of a unit transparent conductive plate azimuthally displaced from a neighboring unit by $2\pi/m'$ radians, wherein m' is a positive integer greater than 1. In another case, the other outer array of transparent conductive plates 80 may comprise n' identical instances of a unit transparent conductive plate azimuthally displaced from a neighboring unit by $2\pi/n'$ radians, wherein n' is a positive integer greater than 1.

The other at least one enclosure-side conductive structure, i.e., the other inner array of transparent conductive plates 70 and the other outer array of transparent conductive plates 80, is substantially transparent. In one case, the material of the other inner array of transparent conductive plates 70 and the other outer array of transparent conductive plates 80 is intrinsically transparent, i.e., transparent irrespective of the thickness of the transparent conductive plates in the other inner array of transparent conductive plates 70 and the other outer array of transparent conductive plates 80 by virtue of the material property. In another case, the other inner array of transparent conductive plates 70 and the other outer array of transparent conductive plates 80 are substantially transparent because the transparent conductive plates are thin enough, e.g., less than the absorption length of the material of the other inner array of transparent conductive plates 70 and the other outer array of transparent conductive plates 80.

In general, the at least two groups of enclosure-side conductive structures, which are employed as the other at least one enclosure-side conductive structure, comprise another array of transparent conductive plates, which may be a radial array in which different conductive transparent conductive plates are radially distributed, an azimuthal array in which different transparent conductive plates are azimuthally distributed, a radial and azimuthal array in which different transparent conductive plates are radially and azimuthally distributed, a linear array in which different transparent conductive plates are distributed along one direction, a two-dimensional rectangular array in which different transparent conductive plates are distributed in a two-dimensional array, or any other array configuration including an irregular array.

The other array of transparent conductive plates may cover the entirety, or a portion of, the area of the transparent upper surface. Electrical bias to the array of transparent membrane-side conductive plates, e.g., the inner array of transparent membrane-side conductive plates 12 and the outer array of transparent membrane-side conductive plates 14, is provided by conductive wires as in the fourth embodiment. Each plate in the inner array of transparent membrane-side conductive plates 12 (See FIGS. 6A and 6B) and the outer array of transparent membrane-side conductive plates 14 (See FIGS. 6A and 6B) may be independently biased to enable various modes of inflection of the transparent membrane 10. The transparent membrane 10 is inflected as in the fourth embodiment. The other array of transparent conductive plates located on the transparent upper surface and the array of transparent conductive plates located on the transparent lower surface operate in tandem to amplify the inflection of the transparent membrane 10.

In a variation of the fifth embodiment, the inner array of transparent membrane-side conductive plates 12 and the outer array of transparent membrane-side conductive plates 14 may be removed and the transparent membrane may be electrostatically charged as in the first through third embodiments. In another variation of the fifth embodiment, one or both of the arrays of transparent conductive plates on the transparent upper surface and the transparent lower surface may be replaced with an array of conductive wire meshes of the second embodiment or a conductive wire mesh of the first embodiment.

Figure 8:
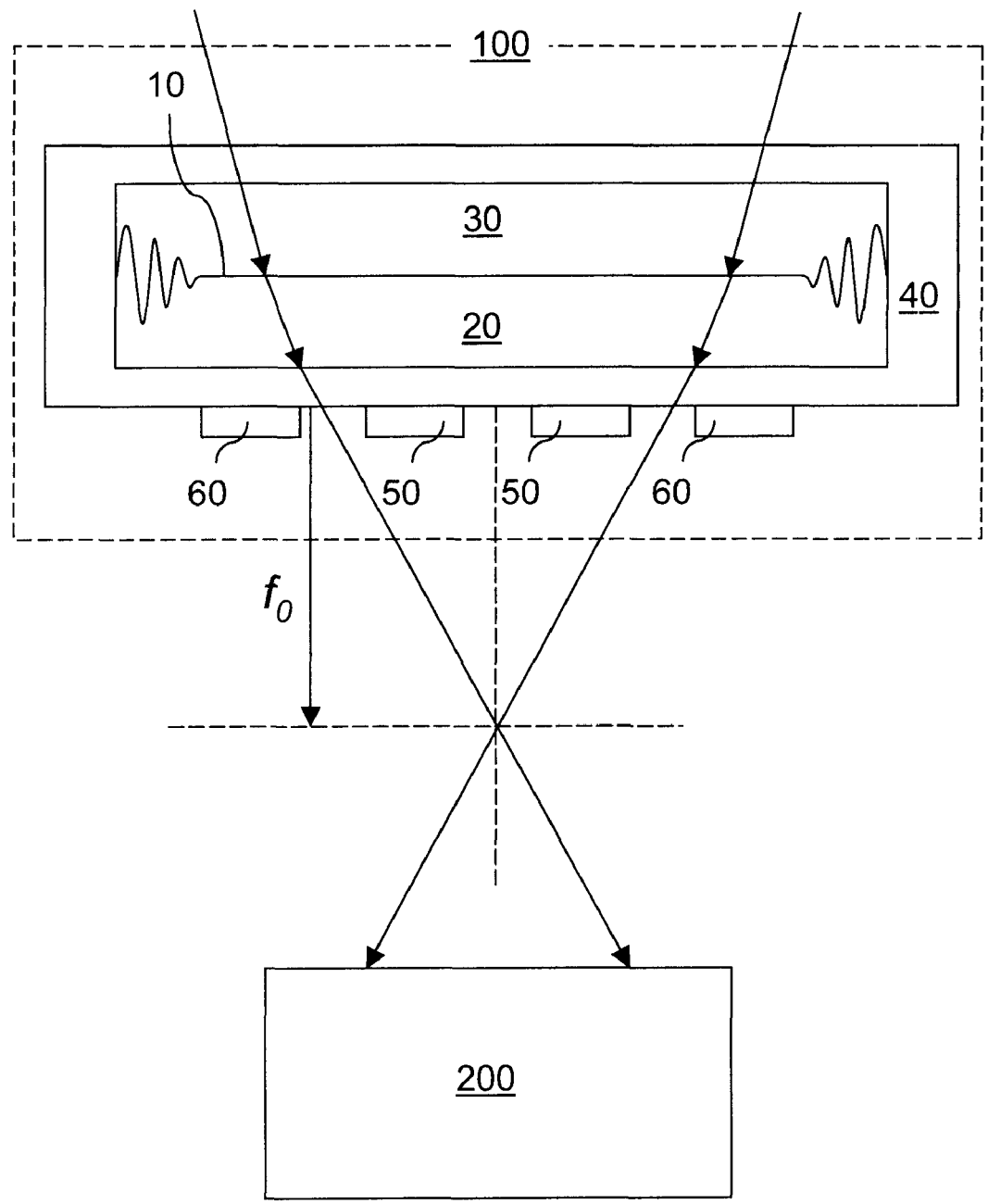
FIG. 8 is a vertical cross-sectional view of a sixth exemplary optical structure according to a sixth embodiment of the present invention when a transparent membrane 10 is not inflected.

Referring to FIG. 8, a vertical cross-sectional view of a sixth exemplary optical structure includes a lens 100 of the present invention as described above and an optically sensitive element 200. The lens 100 may be any one of the first through fifth exemplary structures described above, or a combination thereof. The optically sensitive element 200 is separated from the lens 100 along the direction of the focal point of the lens 100. Optionally, an additional lens (not shown) having a constant focal lens may be provided above the lens 100 and/or between the lens 100 and the optically sensitive element 200 to provide convergence of an optical beam that pass through the lens 100. The optical lens 100 may be an element separated from the lens 100, or may be incorporated onto top surface of the enclosure 40 or a bottom surface of the enclosure 40. The optically sensitive element may be, for example, a light conversion device such as a photosensitive diode, a photosensitive film, a biological eye, etc.

In transparent membrane 10 of the lens 100 is not inflected at this point in one mode of operating the sixth exemplary optical structure. The focal length of the optical system that includes the lens 100 and the optional additional lens, which is the distance of the focal point of the lens 100 from the bottom surface of the lens 100, is at a nominal value, i.e., at a nominal focal length value $f_0$. The focal point is also along the symmetry axis of the physical structure of the lens 100 without any lateral deflection.

Figure 9:
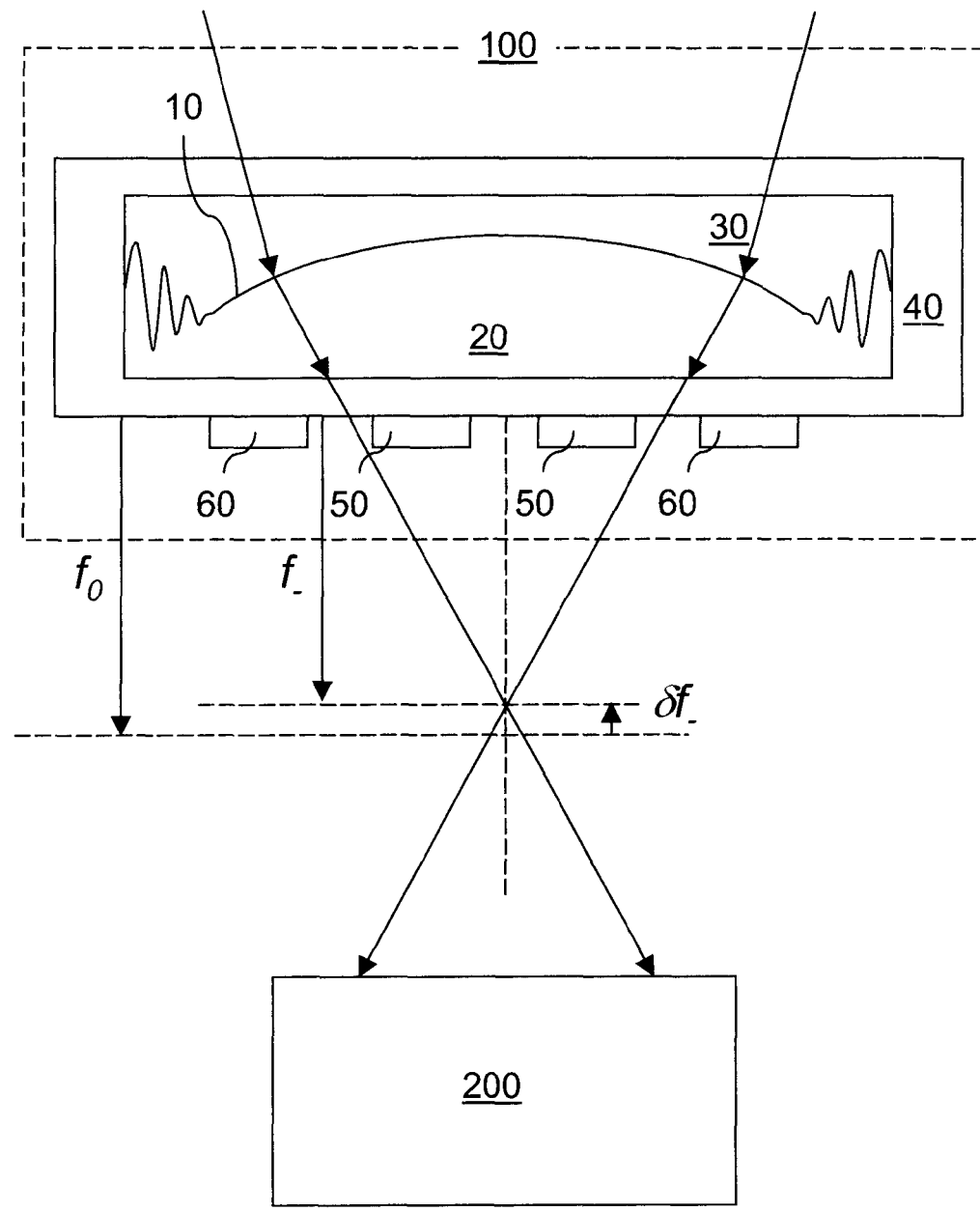
FIG. 9 is a vertical cross-sectional view of the sixth exemplary optical structure according to the sixth embodiment of the present invention when the transparent membrane 10 is electrostatically inflected to reduce the focal length of an inventive lens.

Referring to FIG. 9, the transparent membrane 10 is inflected in a concave shape, i.e., the center portion moves up while the peripheral portion moves down, in another mode of operating the sixth exemplary optical structure. Such an inflection may be induced in any manner described above. Depending on whether the first refractive index is higher or lower than the second refractive index, the focal length of the lens 100 may increase or decrease. For example, if the second refractive index is higher than the first refractive index, the focal length of the lens 100 has a reduced focal length value $f_-$, which is less than the nominal focal length value $f_0$. The focal length reduction $\delta f_-$ depends on the voltage bias applied to the at least one enclosure-side conductive structure. The focal length reduction $\delta f_{31}$ also depends on the amount of charge on the transparent membrane 10 if the lens 100 comprises one of the first through third exemplary structures or on the voltage bias pattern on the at least one membrane-side conductive structure if the lens 100 comprises one of the fourth and fifth exemplary structures.

Figure 10:
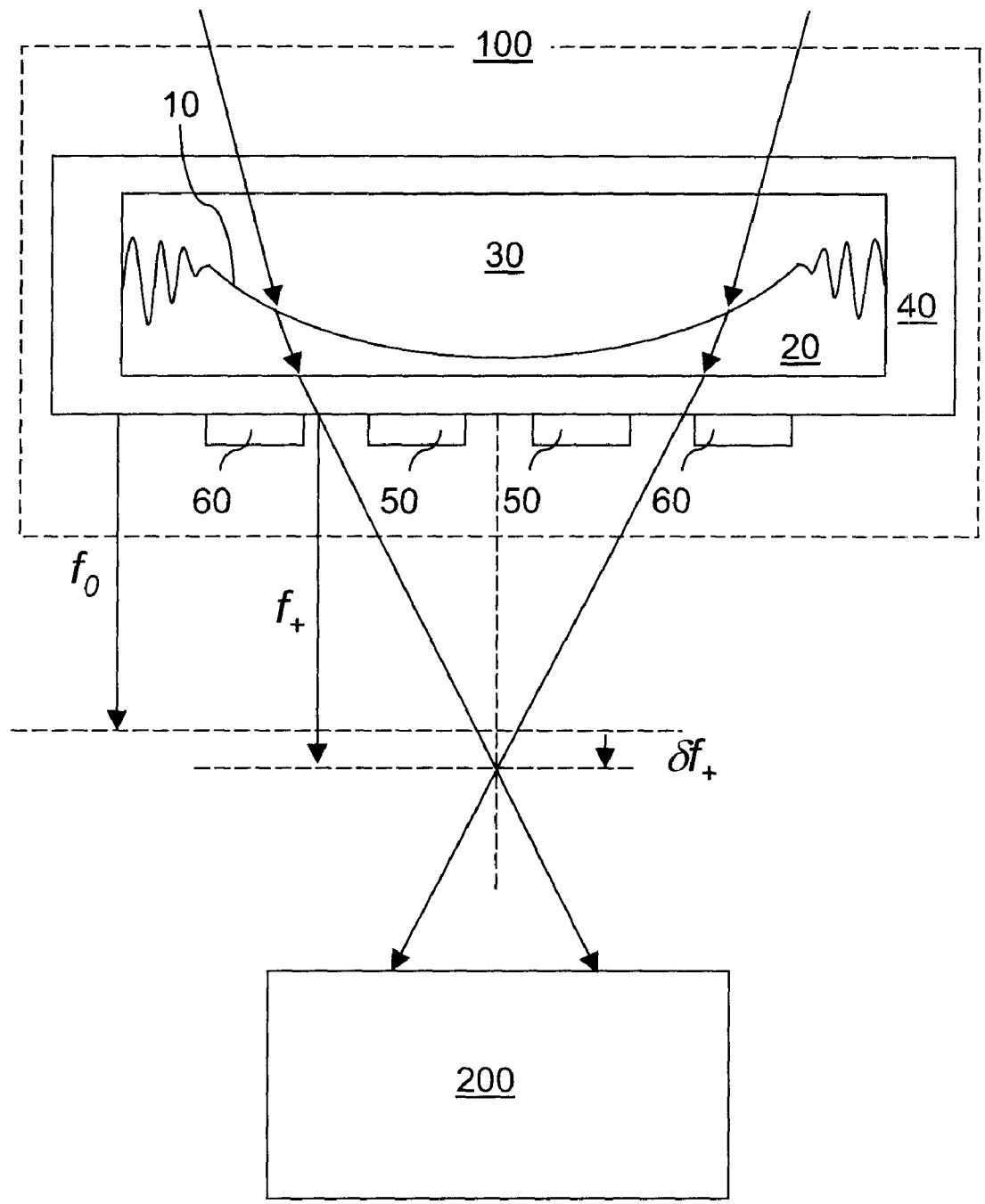
FIG. 10 is a vertical cross-sectional view of the sixth exemplary optical structure according to the sixth embodiment of the present invention when the transparent membrane 10 is electrostatically inflected to increase the focal length of the inventive lens.

Referring to FIG. 10, the transparent membrane 10 is inflected in a convex shape, i.e., the center portion moves down while the peripheral portion moves up, in yet another mode of operating the sixth exemplary optical structure. Such an inflection may be induced in any manner described above. Depending on whether the first refractive index is higher or lower than the second refractive index, the focal length of the lens 100 may increase or decrease. For example, if the second refractive index is higher than the first refractive index, the focal length of the lens 100 has an increased focal length value $f_+$, which is greater than the nominal focal length value $f_0$. The focal length increment $\delta f_+$ depends on the voltage bias applied to the at least one enclosure-side conductive structure. The focal length increment $\delta f_+$ also depends on the amount of charge on the transparent membrane 10 if the lens 100 comprises one of the first through third exemplary structures or on the voltage bias pattern on the at least one membrane-side conductive structure if the lens 100 comprises one of the fourth and fifth exemplary structures.

Figure 11:
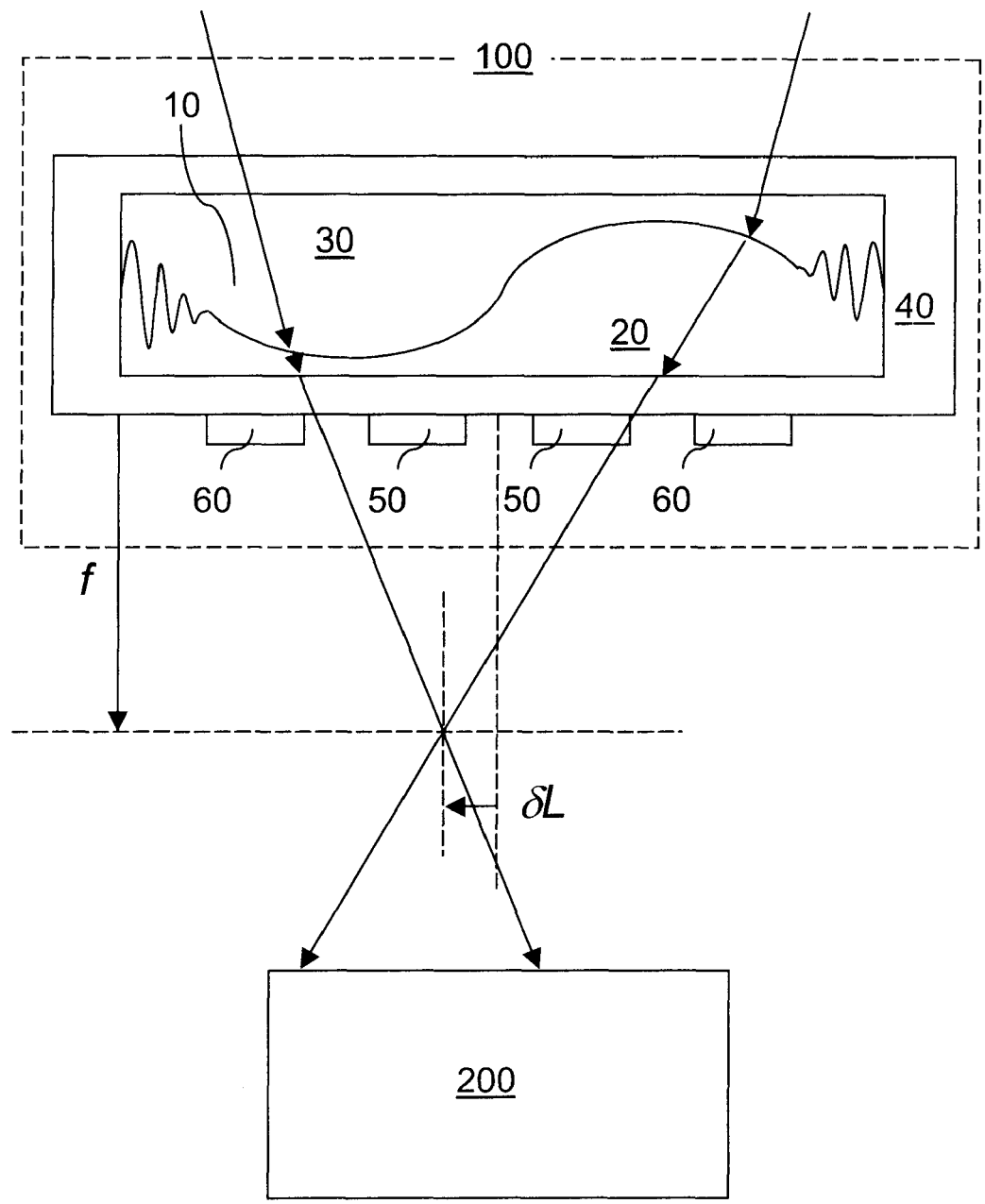
FIG. 11 is a vertical cross-sectional view of the sixth exemplary optical structure according to the sixth embodiment of the present invention when the transparent membrane 10 is electrostatically inflected to laterally shift the focal point of the inventive lens.

Referring to FIG. 11, the transparent membrane 10 is inflected with an azimuthal node, i.e., the one side of the transparent membrane 10 moves down while the other side moves up, in still another mode of operating the sixth exemplary optical structure. Such an inflection may be induced in any manner described above. The focal point of the lens 100 laterally deviates from the original axis of the focal point by a lateral focal point shift distance $\delta L$. By selecting the azimuthal orientation of the azimuthal nodes, the direction of the shift of the focal point may be selected. The focal length of the lens 100 may increase or decrease, or may stay substantially the same. The direction of the focal point shift and the magnitude of the lateral focal point shift distance $\delta L$ depend on the voltage bias applied to the at least one enclosure-side conductive structure. The direction of the focal point shift and the magnitude of the lateral focal point shift distance $\delta L$ also depends on the amount of charge on the transparent membrane 10 if the lens 100 comprises one of the first through third exemplary structures or on the voltage bias pattern on the at least one membrane-side conductive structure if the lens 100 comprises one of the fourth and fifth exemplary structures. If more than one pair of a concave portion and a convex portion are formed in the transparent membrane 10, the lens 10 may form multiple images by splitting an incident light into multiple light paths, or may converge multiple beams into a single beam.

Figure 12:
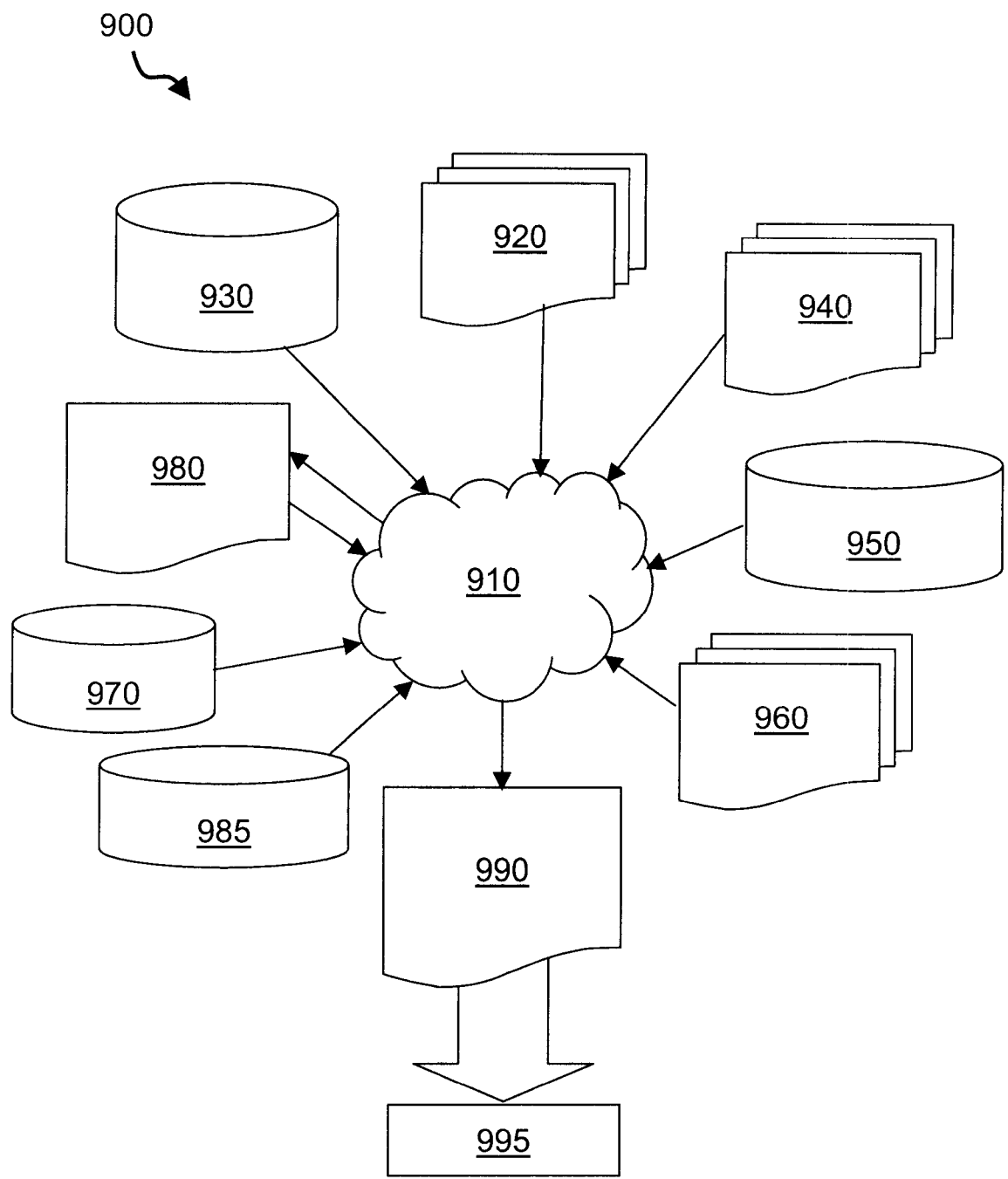
FIG. 12 is a flow diagram of a design process used in design and manufacture of the optical structures according to the present invention.

FIG. 12 a block diagram of an exemplary design flow 900 used for example, in the design and manufacturing of the optical structures of the present invention. Design flow 900 may vary depending on the type of optical structure being designed. For example, a design flow for building an optical structure employed in Micro-Electro-Mechanical Systems may differ from a design flow for designing an optical structure employed for a camera or a telescope. Design structure 920 is preferably an input to a design process 910 and may come from an intellectual property (IP) provider, a core developer, or a design company, or may be generated by the operator of a design flow, or may come from other sources.

Design structure 920 comprises an embodiment of present invention as shown in FIGS. 2-11 in the form of schematics or HDL, hardware description language (e.g. Verilog, VHDL, C, etc.) The design structure 920 may be contained on one or more machine readable medium. For example, design structure 920 may be a text file or a graphical representation of an embodiment of the invention as shown in FIGS. 2-11.

Design process 910 preferably synthesizes (or translates) an embodiment of the invention as show in FIG. 2 into a netlist 980, where the netlist 980 is, for example, a list of mechanical components and fluids. that describes the connections to other elements and structures in the design of the optical structure and recorded on at least one of machine readable medium. For example, the medium may be a CD, a compact flash, other flash memory, a packet of data to be sent via the Internet, or other networking suitable means. The synthesis may be an iterative process in which the netlist 980 is resynthesized one or more times depending on design specifications and parameters for the optical structure.

The design process 910 may include using a variety of inputs; for example, inputs from library elements 930 which may house a set of commonly used elements, structures, and devices, including models, layouts, and symbolic representations, for a given manufacturing technology, design specifications 940, characterization data 950, verification data 960, design rules 970, and test data files 985. One of ordinary skill in the art of designing an optical structure can appreciate the extent of possible design automation tools and applications used in the design process 910 without deviating from the scope and spirit of the present invention. The design structure of the present invention is not limited to any specific design flow.

Design process 910 preferably translates an embodiment of the invention as shown in FIGS. 2-11, along with any additional design or data (if applicable), into a second design structure 990. Design structure 990 resides on a storage medium in a data format used for the exchange of layout data of integrated circuits and/or symbolic data format (e.g., information stored in GDSII (GDS2), GL1, OASIS, map files, or any other suitable format for storing such design structures). Design structure 990 may comprise information such as, for example, symbolic data, map files, test data files, design content files, manufacturing data, layout parameters, wires, levels of metal, vias, shapes, data for routing though the manufacturing line, and any other data required by a semiconductor manufacturer to produce an embodiment of the invention as shown in FIGS. 2-11. Design structure 990 may then proceed to a stage 995 where, for example, design structure 990 proceeds to tape-out, is released to manufacturing, is released to a mold manufacturing facility, is sent to another design house, is sent back to a customer, etc.

While the invention has been described in terms of specific embodiments, it is evident in view of the foregoing description that numerous alternatives, modifications and variations will be apparent to those skilled in the art. Accordingly, the invention is intended to encompass all such alternatives, modifications and variations which fall within the scope and spirit of the invention and the following claims.

What is claimed is:

1. An optical structure comprising:
    an enclosure comprising a transparent upper surface and a transparent lower surface;
    a transparent membrane located within said enclosure and dividing a volume within said enclosure into an upper tank portion and a lower tank portion;
    a first fluid having a first refractive index and filling said upper tank portion;
    a second fluid having a second refractive index and filling said lower tank portion, wherein said second refractive index is different from said first refractive index, wherein said first fluid and said second fluid are non-conductive; and
    at least one enclosure-side conductive structure which abuts said enclosure and is substantially transparent.

2. The optical structure of claim 1, wherein said at least one enclosure-side conductive structure comprises a mesh of conductive wires.

3. The optical structure of claim 1, wherein said at least one enclosure-side conductive structure comprises a transparent conductive plate.

4. The optical structure of claim 1, wherein said at least one enclosure-side conductive structure comprises an array of enclosure-side conductive structures.

5. The optical structure of claim 4, wherein said array of enclosure-side conductive structures comprises at least two groups of enclosure-side conductive structures having different radial distance from a center of said transparent upper surface or a center of said transparent lower surface.

6. The optical structure of claim 4, wherein said array of enclosure-side conductive structures comprises at least two groups of enclosure-side conductive structures having different azimuthal angles around a center of said transparent upper surface or a center of said transparent lower surface.

7. The optical structure of claim 1, wherein said at least one enclosure-side conductive structure comprises at least one upper enclosure-side conductive structure abutting said upper enclosure and at least one lower enclosure-side conductive structure abutting said lower enclosure.

8. The optical structure of claim 1, wherein said transparent membrane is electrically charged and electrically isolated from said enclosure.

9. The optical structure of claim 1, further comprising:
    at least one membrane-side conductive structure which abuts said transparent membrane and is substantially transparent; and
    at least one conductive strip, wherein one end of each of said at least one conductive strip is attached to one of said at least one membrane side conductive structure and another end of each of said at least one conductive strip extends outside said enclosure for electrical connection.

10. The optical structure of claim 9, wherein said at least one membrane-side conductive structure comprises a mesh of conductive wires.

11. The optical structure of claim 9, wherein said at least one membrane-side conductive structure comprises a transparent conductive plate.

12. The optical structure of claim 9, wherein said at least one membrane-side conductive structure comprises an array of enclosure-side conductive structures.

13. The optical structure of claim 12, wherein said array of membrane-side conductive structures comprises at least two groups of membrane-side conductive structures having different radial distance from a center of said transparent upper surface or a center of said transparent lower surface.

14. The optical structure of claim 12, wherein said array of membrane-side conductive structures comprises at least two groups of membrane-side conductive structures having different azimuthal angles around a center of said transparent upper surface or a center of said transparent lower surface.

15. A design structure embodied in a machine readable medium for designing, manufacturing, or testing a design for an optical structure, said design structure comprising:
    a first data representing an enclosure comprising a transparent upper surface and a transparent lower surface;
    a second data representing a transparent membrane located within said enclosure and dividing a volume within said enclosure into an upper tank portion and a lower tank portion;
    a third data representing a means for inducing a non-planar inflection in said transparent membrane, said means comprising an array of enclosure-side conductive structures that includes at least two groups of enclosure-side conductive structures having a different radial distance from a center of said transparent upper surface or a center of said transparent lower surface.

16. The design structure of claim 15, wherein said means for inducing a non-planar inflection is at least one enclosure-side conductive structure which abuts said enclosure and is substantially transparent.

17. The design structure of claim 16, further comprising:
    a fourth data representing a first fluid having a first refractive index and filling said upper tank portion; and
    a fifth data representing a second fluid having a second refractive index and filling said lower tank portion, wherein said second refractive index is different from said first refractive index.

18. The design structure of claim 17, wherein said fourth data represents a non-conductive fluid, and said fifth data represents another non-conductive fluid.

19. The design structure of claim 15, wherein each of said at least one enclosure-side conductive structure comprises a mesh of conductive wires.

20. The design structure of claim 15, wherein each of said at least one enclosure-side conductive structure comprises a transparent conductive plate.

21. The design structure of claim 15, wherein a focal length of said optical structure is configured to be altered by said non-planar inflection.

22. A method of operating an optical structure comprising:
    placing an optical structure in an optical path between an object and an optically sensitive element, wherein said optical structure comprises:
    an enclosure comprising a transparent upper surface and a transparent lower surface;
    a transparent membrane located within said enclosure and dividing a volume within said enclosure into an upper tank portion and a lower tank portion;
    a first fluid having a first refractive index and filling said upper tank portion; and
    a second fluid having a second refractive index and filling said lower tank portion, wherein said second refractive index is different from said first refractive index; and inducing a non-planar inflection of said transparent membrane, wherein said optical path is altered by said non-planar inflection, and a focal point of said optical structure is laterally shifted by said non-planar inflection.

23. The method of claim 22, wherein said non-planar inflection is induced by electrostatic means.

24. The method of claim 22, wherein a focal length of said optical structure is altered by said non-planar inflection.

25. The method of claim 22, wherein said physical location of said enclosure of said optical structure is held constant relative to said optically sensitive element while said non-planar inflection is induced.

26. The method of claim 22, wherein said first fluid and said second fluid are non-conductive.

27. The method of claim 22, wherein said optical structure includes at least one enclosure-side conductive structure that comprises a mesh of conductive wires.

28. The method of claim 22, wherein said optical structure includes at least one enclosure-side conductive structure that comprises a transparent conductive plate.

29. The method of claim 22, wherein said optical structure further comprises at least one enclosure-side conductive structure which abuts said enclosure and is substantially transparent.

30. The method of claim 22, wherein said optical structure further comprises:
at least one membrane-side conductive structure which abuts said transparent membrane and is substantially transparent; and
at least one conductive strip, wherein one end of each of said at least one conductive strip is attached to one of said at least one membrane side conductive structure and another end of each of said at least one conductive strip extends outside said enclosure for electrical connection.

* * * * *